(12) United States Patent
Azadegan

(10) Patent No.: US 6,614,845 B1
(45) Date of Patent: *Sep. 2, 2003

(54) METHOD AND APPARATUS FOR DIFFERENTIAL MACROBLOCK CODING FOR INTRA-FRAME DATA IN VIDEO CONFERENCING SYSTEMS

(75) Inventor: Faramarz Azadegan, San Diego, CA (US)

(73) Assignee: Verizon Laboratories Inc., Waltham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 635 days.

(21) Appl. No.: 08/941,785

(22) Filed: Sep. 30, 1997

Related U.S. Application Data

(60) Provisional application No. 60/033,426, filed on Dec. 24, 1996.

(51) Int. Cl.[7] .................................................. H04N 7/12
(52) U.S. Cl. ................................................. 375/240.13
(58) Field of Search ................................. 348/384, 390, 348/400, 401, 402, 409, 415, 416, 420, 421; 382/232, 233, 236, 238; 375/240.01, 240.12, 240.13, 240.24; H04N 7/12

(56) References Cited

U.S. PATENT DOCUMENTS

| | | | | |
|---|---|---|---|---|
| 4,281,344 A | * | 7/1981 | Mounts | 348/401 |
| 4,704,628 A | * | 11/1987 | Chen | 348/400 |
| 4,930,013 A | * | 5/1990 | Leaning | 348/422 |
| 5,226,093 A | * | 7/1993 | Iwase | 348/416.1 |
| 5,262,878 A | * | 11/1993 | Esserman | 358/430 |
| 5,294,974 A | * | 3/1994 | Naimpally | 348/405 |
| 5,386,248 A | * | 1/1995 | De Haan | 348/699 |
| 5,684,534 A | * | 11/1997 | Harney | 348/390 |
| 5,815,636 A | * | 9/1998 | Fujii | 386/116 |
| 5,883,823 A | * | 3/1999 | Ding | 708/402 |
| 5,905,535 A | * | 5/1999 | Kerdranvat | 348/416 |
| 5,933,571 A | * | 8/1999 | Bannai | 386/112 |

* cited by examiner

Primary Examiner—Young Lee
(74) Attorney, Agent, or Firm—Leonard Charles Suchyta; James K. Weixel

(57) ABSTRACT

A process for reducing spatial redundancy and thereby increasing the efficiency of video compression techniques for video conferencing. A process for improving video coding by differential macroblock coding. One video coding process involves differential formation for the coding of each macroblock in comparison to at least one other macroblock within each video picture. Another video coding process involves differential formation for macroblock coding by comparison to two macroblocks, including the macroblock immediately to the left of the coding macroblock and the macroblock immediately above the coding macroblock. These processes involve improvements to the H.263 video coding standard as well as improvements to the H.324 video conferencing standard. These processes also involve improvements to the MPEG-2 and MPEG-4 video standards.

66 Claims, 15 Drawing Sheets

FIG. 15

| Sequence | Akiyo | Coast Guard | Container | Carphone | Clair | Foreman | Miss Am | Mother & Daughter | Salesman |
|---|---|---|---|---|---|---|---|---|---|
| Percent Savings | 30.51 | 4.72 | 15.65 | 6.06 | 28.07 | 3.53 | 16.65 | 4.24 | 2.50 |

FIG. 17

| Q | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|
| CG | 0.24 | 0.44 | 0.85 | 1.11 | 1.77 | 2.24 | 3.03 | 3.78 | 4.72 | 5.65 | 6.64 | 7.41 | 8.75 | 9.66 | 10.46 | 11.21 | 12.03 | 12.75 | 13.68 | 14.40 | 15.36 | 16.00 |
| Akiyo | 8.1 | 17.5 | 22.3 | 24.2 | 25.8 | 27.2 | 28.4 | 29.5 | 30.5 | 31.6 | 32.7 | 33.3 | 34.0 | 34.4 | 35.2 | 35.6 | 36.1 | 36.5 | 37.0 | 37.5 | 37.9 | 38.2 |

FIG. 18

METHOD AND APPARATUS FOR DIFFERENTIAL MACROBLOCK CODING FOR INTRA-FRAME DATA IN VIDEO CONFERENCING SYSTEMS

This application claims the benefit of provisional application Ser. No. 60/033,426 filed Dec. 24, 1996.

BACKGROUND OF THE INVENTION

1. Field of the Invention

The present invention relates generally to data compression for the coding of video image signals. More particularly, the invention relates to a method for coding a macroblock for intra-frame data representing the digital embodiment of video image signals in video conferencing systems.

2. Description of the Related Art

The electronic transmission of video pictures, either analog or digital, has presented various problems of both transmission quality and transmission efficiency in the art of video conferencing. In the context of digital transmissions particularly, quality and efficiency issues are frequently intertwined. Over the years, the most common solution to these issues has involved various types of video compression.

There are two types of video compression, spatial compression and temporal compression. Spatial compression strives to achieve a reduction in the information content of the video transmission by applying mathematical methods to reduce the redundancy of the contents of one video frame in comparison to another (thus, to reduce spatial redundancy). For video conferencing systems (that is, low bit rate coding applications), this problem is even more pronounced because such video scenes generally contain a highly correlated background and a foreground with a small to medium amount of motion. One of the most common mathematical methods for reducing spatial redundancy is discrete cosine transform (DCT), as used by the Joint Picture Experts Group (JPEG) standard. In particular, television video signals, for example, are frequently compressed by DCT to reduce spatial redundancy pursuant to the Motion-JPEG (M-JPEG) standard.

In contrast to-spatial compression, temporal compression is frequently used for video signals other than television video signals. Video conferencing, for example, frequently applies temporal compression for purposes of video compression, pursuant to the Motion Picture Experts Group (MPEG) standard. One of the fundamental elements of temporal compression involves the reduction of data rates, and a common method for reducing data rates in temporal compression is motion compensation. Motion compensation is a method of predicting one frame based upon an earlier frame. For example, in motion compensation, a predicted frame (P-frame) is based on an intra-coded frame (I-frame, that is, a frame that has only been spatially coded). In this manner, using temporal compression, the P-frame is coded based on the I-frame. Thus, if there is little difference between Alto the P-frame and the I-frame, motion compensation may result in a significant reduction of the data needed to represent the content of the video using temporal compression.

Various standards have been proposed for using both spatial and temporal compression for the purposes of video compression. The International Telecommunication Union (ITU), for example, has established the H.324 standard for the transmission of low bit-rate multimedia over general switched telephone networks, which includes video conferencing. The H.324 video conferencing standard generally utilizes the H.263 video coding system. H.324 also plans to incorporate a proposed improvement for H.263, namely, H.263+ as well as H.263++. Currently, however, H.263 represents the most recognized form of video compression for video conferencing, including the various MPEG standards, such as MPEG-1 and MPEG-2, which use the H.324/H.263 standard. Indeed, the proposed MPEG-4 standard will also incorporate the H.324/H.263 standard.

All of these standards, however, focus more on temporal compression than spatial compression, most likely due to the focus on compression for video conferencing. Indeed, most of these standards utilize some form of block-matching, motion-estimation compensation technique to accomplish temporal compression, generally by inter-frame (or P-frame) coding. As a result, the focus on temporal compression has resulted in a lack of attention to spatial compression. Also, the use of inter-frame (P-frame) temporal coding has resulted in little development of intra-frame (I-frame) coding techniques. Moreover, even the known I-frame coding techniques do not take full advantage of the inter-block correlation present in typical pictures of video conferencing systems.

This inattention in video compression to I-frame spatial coding gives rise to inefficiencies and other diminutions in quality that could be achieved by further development of compression techniques for I-frame spatial coding. Thus, the current video coding techniques reflect an unsatisfactory development of methods to diminish spatial redundancy in I-frame coding to provide better efficiency and better quality for video compression, particularly for video conferencing applications.

SUMMARY OF INVENTION

Accordingly, the present invention is directed to a method that substantially obviates one or more of the problems due to the limitations, shortcomings, and disadvantages of the related art.

One advantage of the invention is greater efficiency in video compression by reducing spatial redundancy through improvements in intra-frame coding.

Another advantage of the invention is the improvement of the standard coding protocols, such as the H.263 video coding standard and the H.324 video conferencing standard, which ensures forward compatibility.

To achieve these and other advantages, one aspect of the invention includes a method of data compression. This method comprises receiving a plurality of macroblocks; selecting one of the macroblocks; determining a difference between the selected macroblock and at least one other macroblock; and encoding the selected macroblock based on the difference.

A further aspect of the invention includes a method of coding and decoding. This method comprises encoding a coding macroblock based on a difference between the coding macroblock and a reference macroblock; and decoding the coding macroblock based on the difference between the coding macroblock and the reference macroblock.

Another aspect of the invention includes a method of coding. This method comprises a storing component configured to store a reference macroblock; a receiving component configured to receive a coding macroblock to be coded; a determining component configured to determine a difference between the coding macroblock and the reference macroblock; and an encoding component configured to encode the coding macroblock based on the difference.

Still another aspect of the invention includes a method of decoding. This method comprises a storing component configured to store a reference macroblock; a receiving component configured to receive a coded macroblock, which was coded based on a difference with the reference macroblock; and a decoding component configured to decode the coded macroblock based on the difference.

Additional aspects of the invention are disclosed and defined by the appended claims. It is to be understood that both the foregoing general description and the following detained description are exemplary and explanatory and are intended to provide further explanation of the invention as claimed.

BRIEF DESCRIPTION OF THE DRAWINGS

The accompanying drawings illustrate a preferred embodiment of the invention. The drawings are incorporated in and constitute a part of this specification. In the drawings.

FIG. 15 is a diagram of a sample representation of the DCT values contained within the three macroblocks of FIG. 13;

FIG. 17 is a diagram of an example of the efficiency improvement gained by the claimed macroblock coding technique;

FIG. 18 is another diagram of an example of the efficiency improvement gained by the claimed macroblock coding technique;

DETAILED DESCRIPTION

Introduction

Methods consistent with the invention avoid the inefficiencies of the prior art video compression techniques by diminishing spatial redundancy in current intra-frame (I-frame) coding. The methods use the structure of the H.324 video conferencing standard as well as the structure of the H.263 video coding standard. The recommendation reports for these standards, as described in International Telecommunication Union, Telecommunication Standardization Sector, Recommendation H.324, Terminal for Low Bit Rate Multimedia Communication (March 1996), and International Telecommunication Union, Telecommunication Standardization Sector, Recommendation H.263, Video Coding for Low Bit Rate Communication (March 1996), are hereby incorporated by reference.

To achieve an improvement in I-frame coding, an implementation consistent with the invention provides for comparing a coding macroblock to at least one other reference macroblock in order to determine a difference. The coding macroblock is then encoded with the difference. One implementation consistent with the invention also results in the addition of two components to the protocol structure of the macroblock layer in the H.263 standard. Thus, when the method is used, a value is assigned to a difference component to indicate the encoding of the coding macroblock, and a value is assigned to a reference component to indicate the location of the reference macroblock. Alternatively, when there is an insubstantial difference between the coding macroblock and the reference macroblock, the method is not used, and the difference component indicates no coding, and the reference macroblock is not utilized.

In the preferred implementation, the comparison of macroblocks occurs by comparing the coding macroblock against the macroblock immediately left of the coding macroblock and immediately above the coding macroblock, if a macroblock exists at either or both of these positions. However, the methods similarly operate in comparison to other macroblocks as reference macroblocks with similar gains in efficiency. Additionally, the methods may also operate on other levels of the video sequence, including blocks and groups of blocks (or slices of video).

Video Conferencing System

Figure 1:
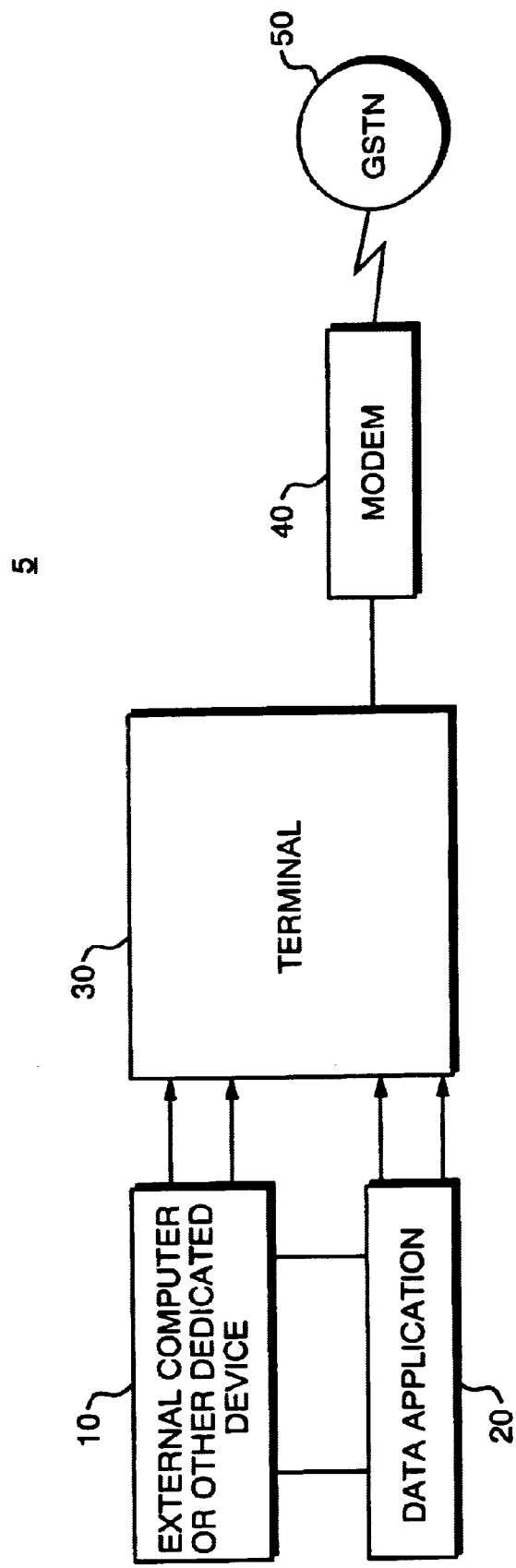
FIG. 1 is a block diagram of a video conferencing system.

FIG. 1 illustrates a video conferencing system according to the present invention. System 5 comprises an external computer or other dedicated device 10, data application 20, terminal 30, modem 40, and general switched telephone network (GSTN) 50. External computer 10 implements video conferencing with data application 20, transmitting the video, audio, and data. External computer 10 and data application 20 then interact with terminal 30. In a sending mode, terminal 30 encodes the video, audio, and data and then transmits the encoded information to modem 40, which transmits the information to GSTN 50. Correspondingly, in a receiving mode, the operation of system 5 in FIG. 1 functions similarly, except that GSTN 50 initially receives the encoded information, provides the encoded information to modem 40, which transmits the information to terminal 30, which then decodes the video, audio, and data, and then terminal 30 transmits the video, audio, and data to external computer 10 and data application 20.

Figure 2:
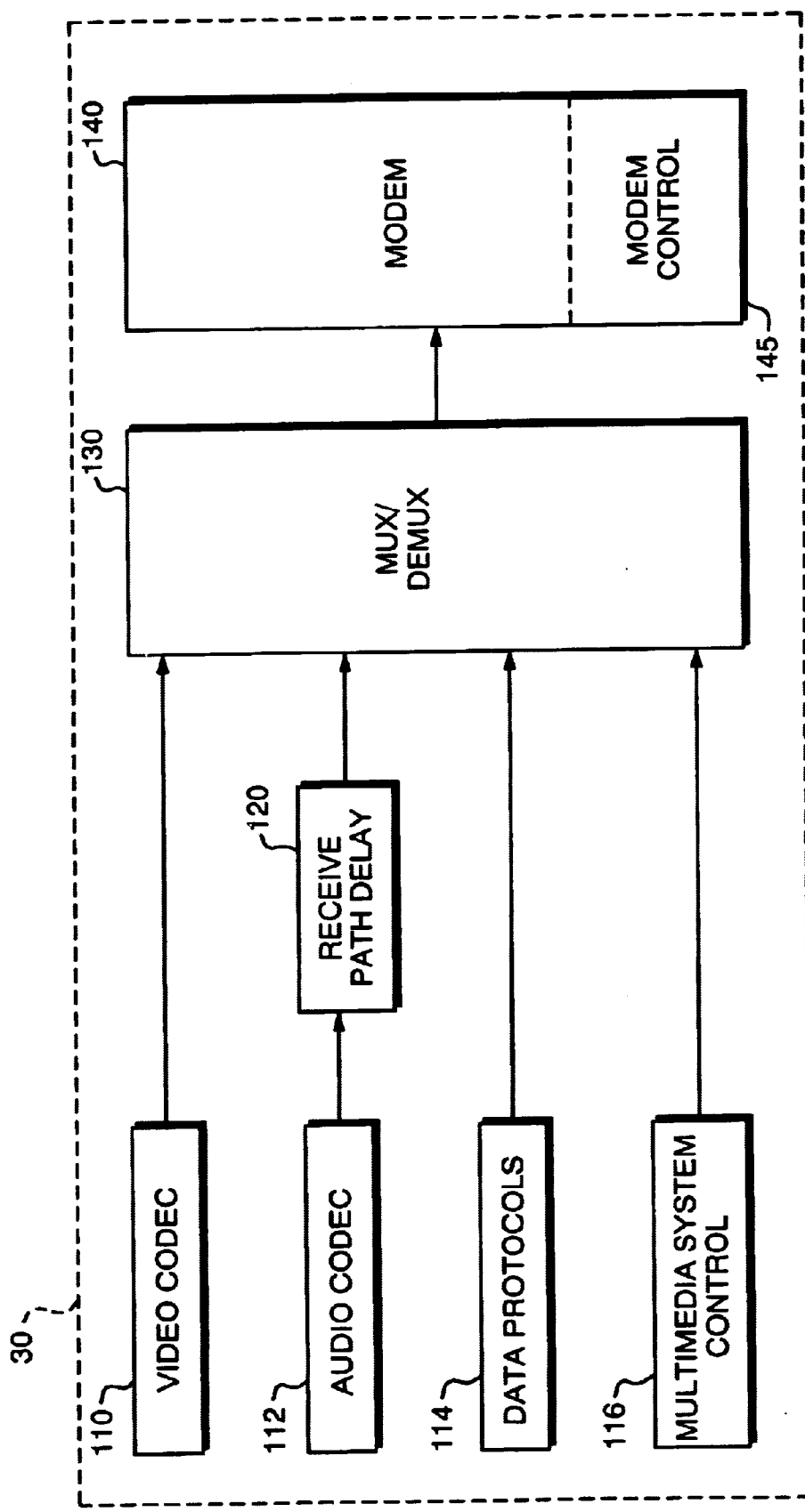
FIG. 2 is a block diagram of a terminal from the video conferencing system in FIG. 1.

As shown in FIG. 2, terminal 30 comprises video codec 110, audio codec 112, data protocols 114, multimedia system control 116, receive path delay 120, multiplexer/demultiplexer 130, modem 140, and modem control 145. Terminal 30 transforms a video signal into a format suitable for transmission over-GSTN 50 via modem 40. In one common embodiment as a multimedia telephone terminal, terminal 30 provides for the transmission and receipt of real, live-time video, audio, or data, or any combination thereof, along with the necessary control codes.

Each component of terminal 30 preferably implements certain functions dictated by the H.324 standard. Video codec 110, using either the H.263 or H.261 standard, carries out redundancy reduction coding and decoding for video streams. Audio codec 112, using the G.723.1 standard, encodes the audio signal from the microphone for transmission, and decodes the audio code which is output to the speaker. Optional receive path delay 120 in the receiving audio path compensates for the video delay, so as to maintain audio and video synchronization. Data protocols 114 support data applications such as electronic whiteboards, still image transfer, file exchange, database access, audiographics conferencing, remote device control, and network protocols. Standardized data applications include T120 for real-time audiographics conferencing, T84 simple point-point still image file transfer, T434 simple point-point file transfer, H.224/H.281 far-end camera control, IS/IEC TR9577 network protocols including PPP and IP, and transport of user data using buffered V.14 or LAPM/V.42. Other applications and protocols may also be used via H.245 negotiation. Multimedia system control 116, using the H.245 standard, provides end-to-end signaling for proper operation of the H.324 terminal, and signals all other end-to-end system functions including reversion to analogue speech-only telephony mode. It provides for capability exchange, signaling of commands and indications, and messages to open and fully describe the content of logical channels. Multiplexer/Demultiplexer 130, using the H.223 standard, multiplexes transmitted video, audio, data and control streams into a single bit stream, and demultiplexes a received bit stream into various multimedia streams. In addition, it performs logical framing, sequence numbering, error detection, and error-correction by means of retransmission, as appropriate to each media type. Modem 140, using the V.34 standard, converts the H.223 synchronous multiplexed bit stream into an analogue signal that can be transmitted over the GSTN, and converts the received analogue signal into a synchronous bit stream that is sent to the Multiplex/Demultiplex protocol unit. Modem control 145, using the V.25 standard, is used to provide control/sensing of the modem/network interface, when the modem with network signaling and V.8/V.8 bis functional elements is a separate physical item.

Video codec 110 implements the H.263/H.261 video coding standards. Video codec 110 conducts the spatial redundancy reduction coding and decoding for video streams. The term "codec" refers to a coder decoder. The H.263 and H.261 video coding standards are two separate coding/decoding techniques. The H.324 standard requires support for both the H.263 and the H.261 video coding standards. Accordingly, the H.324 standard recognizes and utilizes five standardized video image formats: 16CIF, 4CIF, CIF, QCIF, and SQCIF: H.261 employs CIF and QCIF, and H.263 employs 4CIF, 16CIF and SQCIF. For each of these picture formats, the luminance sampling structure is dx pixels per line, dy lines per picture in an orthogonal arrangement. Sampling of each of the two color difference components is at dx/2 pixels per line, dy/2 lines per picture, orthogonal. The values of dx, dy, dx/2 and dy/2 are given in the following table for each of the picture formats.

| Picture Format | Number of pixels for luminance (dx) | Number of lines for luminance (dy) | Number of pixels for chrominance (dx2) | Number of lines for chrominance (dy/2) |
| --- | --- | --- | --- | --- |
| sub-QCIF | 128 | 96 | 64 | 48 |
| QCIF | 176 | 144 | 88 | 72 |
| CIF | 352 | 288 | 176 | 144 |
| 4CIF | 704 | 576 | 352 | 288 |
| 16CIF | 1408 | 1152 | 704 | 576 |

For each of the picture formats, color difference samples are sited such that their block boundaries coincide with luminance block boundaries. The pixel aspect ratio is the same for each of these picture formats and is the same as defined for QCIF and CIF in H.261: (4/3)*(288/352). The picture area covered by all picture formats except the sub-QCIF picture format has an aspect ratio of 4:3. All decoders operate using sub-QCIF. All decoders operate using QCIF. Some decoders may also operate with CIF, 4CIF or 16CIF. Encoders may also operate with one of the formats sub-QCIF and QCIF. The encoders determine which of these two formats are used, and are not obliged to be able to operate with both. Some encoders can also operate with CIF, 4CIF or 16CIF. Which formats can be handled by the decoder is signaled by external means.

Figure 3:
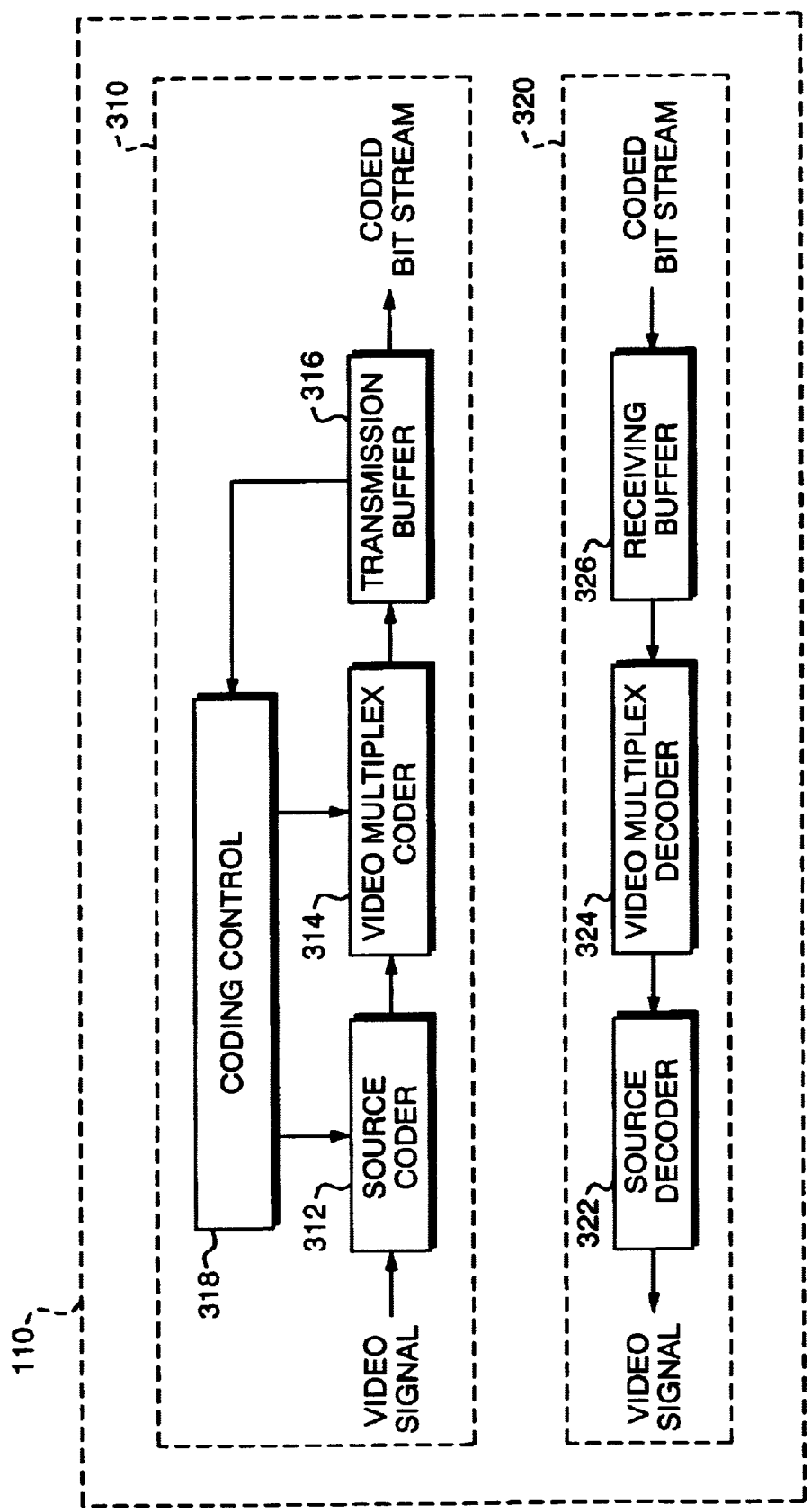
FIG. 3 is a block diagram of a codec utilizing the H.324 video conferencing standard and the H.263 video coding standard from the terminal in FIG. 2.

FIG. 3 is a detailed block diagram of video codec 110. Video codec 110 comprises video coder 310 and video decoder 320. Video coder 310 includes source coder 312, video multiplex coder 314, transmission buffer 316, and coding control 318. Video decoder 320 includes source decoder 322, video multiplex decoder 324, and receiving buffer 326. Accordingly, the structure of video codec 110 provides for bidirectional coding with video signals coded via source coder 312 to a coded bit stream or a coded bit stream decoded via source decoder 322 to a video signal. Pictures are sampled at an integer multiple of the video line rate, reflective of the sampling clock and the digital network clock, which are asynchronous. To permit use in and between regions using 625- and 525-line television standards, source coder 312 generally operates on pictures based on a Common Intermediate Format (CIF). The standards of the input and output television signals, which may, for example, be composite or component, analogue or digital, and the methods of performing any necessary conversion to and from the source coding format are not subject to the H.263 standard. Source decoder 322 performs the reverse process for decoding. Video multiplex coder 314 provides a self-contained digital bit stream which may be combined with other multi-facility signals. Video multiplex decoder 324 performs the reverse process for decoding. Transmission buffer 316 controls its output bit stream. Video data shall be provided on every valid clock cycle. This can be ensured by MCBPC stuffing or, when forward error correction is used, also by forward error correction stuffing frames. The number of bits created by coding any single picture may not exceed a maximum value specified by the parameter BPPmaxKb which is measured in units of 1024 bits. The minimum allowable value of the BPPmaxKb parameter depends on the largest source picture format that has been negotiated for use in the bit stream. An encoder may use a larger value for BPPmaxKb provided the larger value is first negotiated by external means. Receiving buffer 326 performs the reverse process for decoding.

Video codec 110 provides for encoding (and thus also decoding) depending on the operation of coding control 318. In turn, coding control 318 depends on the source coding algorithm. For this purpose, a hybrid of inter-picture prediction to utilize temporal redundancy and transform coding of the remaining signal to reduce spatial redundancy is used. The decoder has motion compensation capability, allowing optional incorporation of this technique in the coder. Half pixel precision is used for the motion compensation, as opposed to H.261 where full pixel precision and a loopfilter are used. Variable length coding is used for the symbols to be transmitted. In the H.263 standard, four negotiable coding options are included: (1) unrestricted motion vector mode; (2) syntax-based arithmetic coding mode; (3) advanced prediction mode; and (4) PB-frame mode.

In unrestricted motion vector mode, optional mode motion vectors are allowed to point outside the picture. The edge pixels are used as prediction for the "not existing" pixels. With this mode a significant gain is achieved if there is movement across the edges of the picture, especially for the smaller picture formats. Additionally, this mode includes an extension of the motion vector range so that larger motion vectors can be used. This is especially useful in case of camera movement.

In syntax-based arithmetic coding mode, optional mode arithmetic coding is used instead of variable length coding. The SNR and reconstructed pictures will be the same, but significantly fewer bits will be produced.

In advanced prediction mode, optional mode Overlapped Block Motion Compensation (OBMC) is used for the luminance part of P-pictures. Four 8×8 vectors instead of one 16×16 vector are used for some of the macroblocks in the picture. The encoder has to decide which type of vectors to use. Four vectors use more bits, but give better prediction. The use of this mode generally gives a considerable improvement; in particular, a subjective gain is achieved because OBMC results in less blocking artifacts.

In PB-frames mode, PB-frame consists of two pictures being coded as one unit. The name PB comes from the name of picture types where there are P-pictures and B-pictures. Thus, a PB-frame consists of one P-picture which is predicted from the previous decoded P-picture and one B-picture which is predicted from both the previous decoded P-picture and the P-picture currently being decoded. The name B-picture was chosen because parts of B-pictures may be bidirectionally predicted from the past and future pictures. With this coding option, the picture rate can be increased considerably without increasing the bit rate much. Significantly, all of these coding options can be used together or separately.

Figure 4:
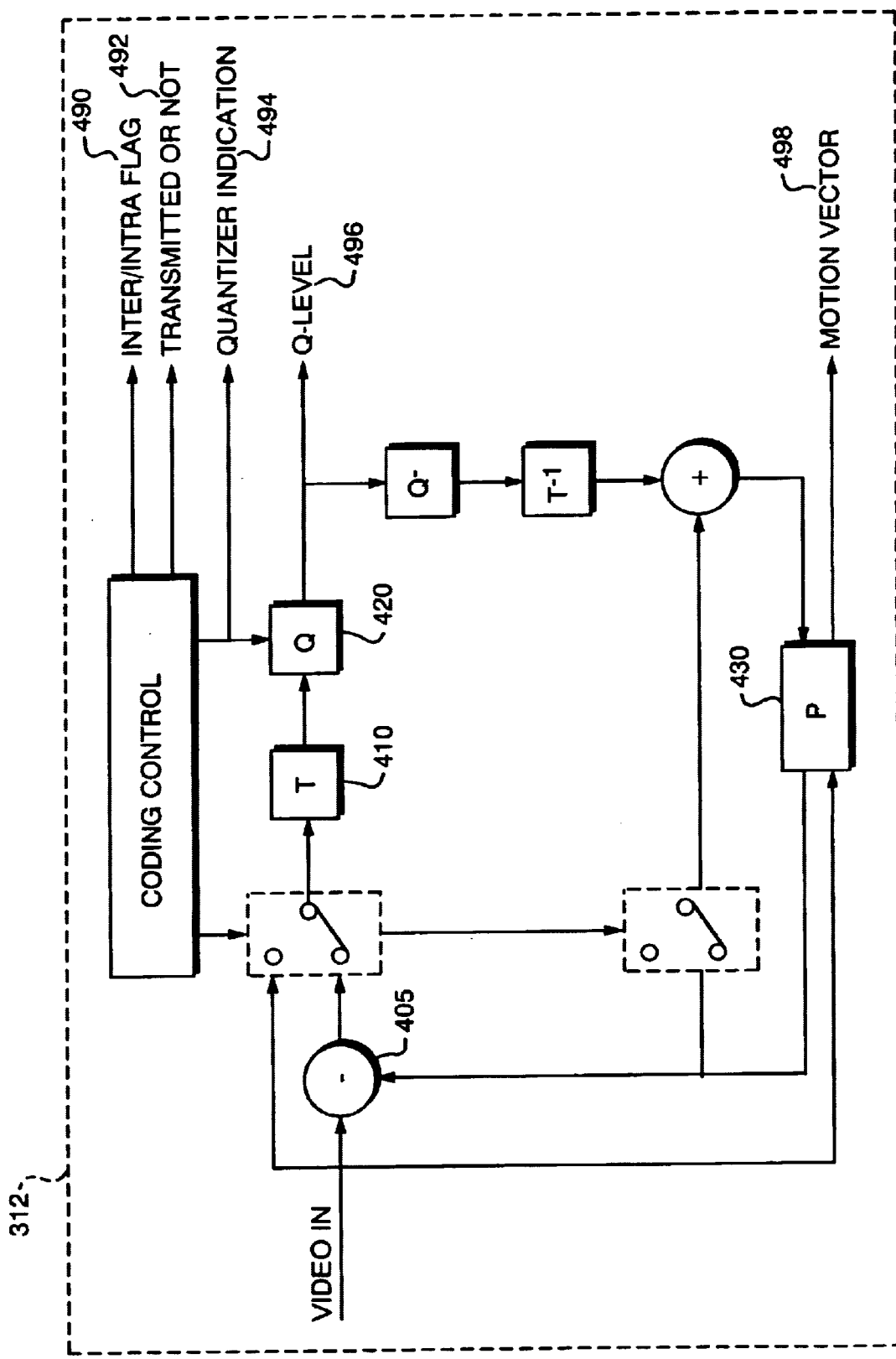
FIG. 4 is a block diagram of a source coder from the video codec in FIG. 3.

FIG. 4 is a detailed diagram of source coder 312. With the inverse embodiment of this figure, this depiction of source coder 312 would also operate as source decoder 322. Source coder 312 operates on non-interlaced pictures occurring 30,000/1001 (approximately 29.97) times per second. The tolerance on picture frequency is ±50 ppm. Pictures are coded as luminance and two color difference components (Y, $C_B$ and $C_R$). These components and the codes representing their sampled values are: black=16; white=235; zero color difference=128; and peak color difference=16 and 240. These values are nominal ones and the coding algorithm functions with input values of 1 through to 254.

Upon receipt of a video input in source coder 312, a picture (or frame) is divided into a slice or group of blocks (GOBs). A GOB comprises k*16 lines, depending on the picture format (k=1 for sub-QCIF, QCIF and CIF; k=2 for 4CIF; k=4 for 16 CIF). The number of GOBs per picture is 6 for sub-QCIF, 9 for QCIF, and 18 for CIF, 4CIF and 16CIF. The GOB numbering is done by use of vertical scan of the GOBs, starting with the upper GOB (number 0) and ending with the lower GOB. Data for each GOB consists of a GOB header (may be empty) followed by data for macroblocks. Data for GOBs is transmitted per GOB in increasing GOB number. Each GOB is then divided into macroblocks. A macroblock relates to 16 pixels by 16 lines of Y and the spatially corresponding 8 pixels by 8 lines of $C_B$ and $C_R$. Further, a macroblock consists of four luminance blocks and two spatially corresponding color difference blocks. Each luminance or chrominance block relates to 8 pixels by 8 lines of Y, $C_B$ and $C_R$. A GOB comprises one macroblock row for sub-QCIF, QCIF and CIF, two macroblock rows for 4CIF, and four macroblock rows for 16 CIF. The macroblock numbering is done by use of horizontal scan of the macroblock rows from left to right, starting with the upper macroblock row and ending with the lower macroblock row. Data for the macroblocks is transmitted per macroblock in increasing macroblock number. Data for the blocks is transmitted per block in increasing block number. The criteria for choice of mode and transmitting a block may be varied dynamically as part of the coding control strategy.

Figure 5:
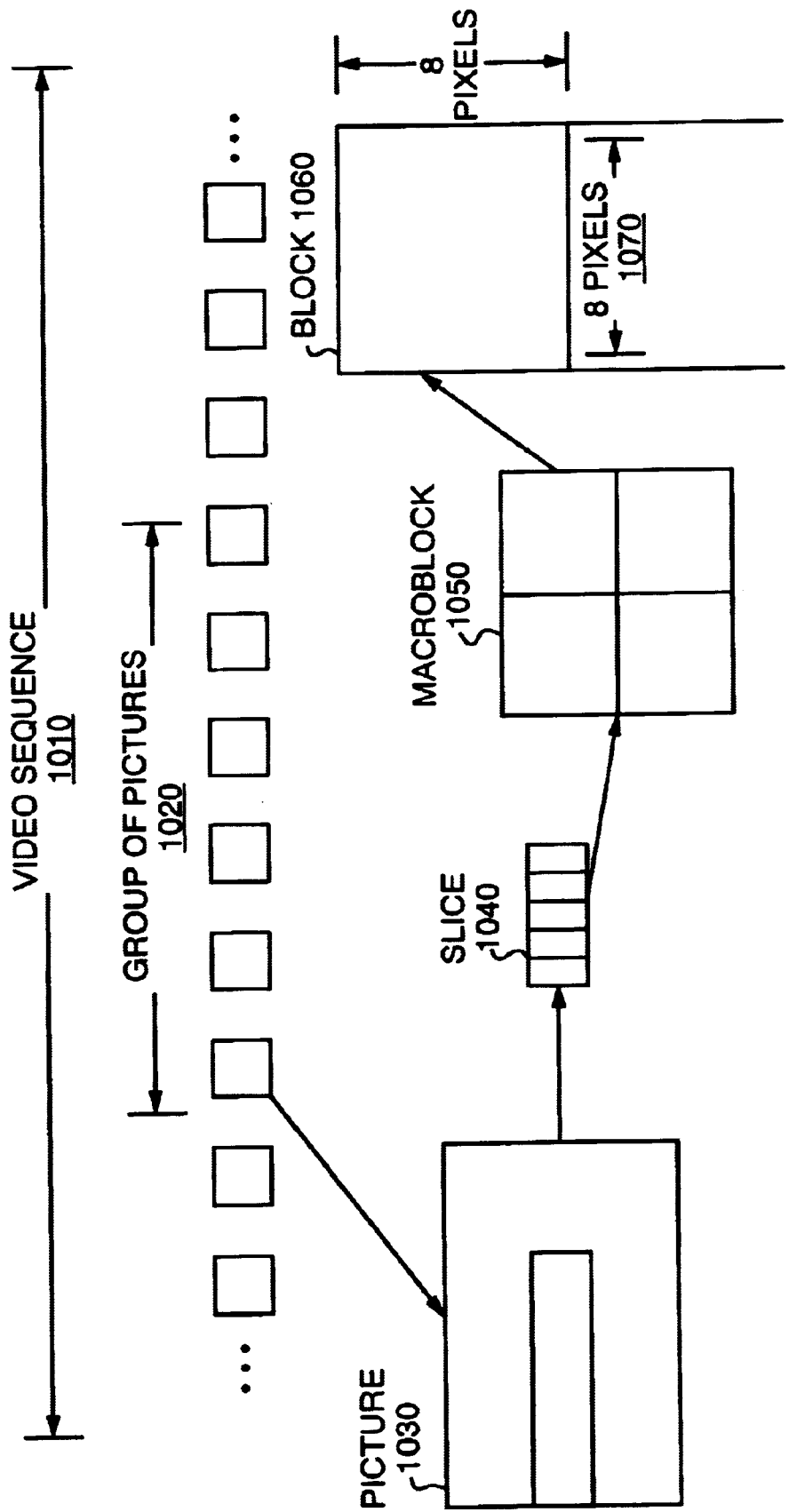
FIG. 5 is a block diagram used to explain a sample video sequence.

FIG. 5 illustrates the process of dividing video input to obtain a macroblock, as described above. FIG. 5 depicts sample video sequence 1010. Video sequence 1010 comprises a group of pictures 1020. Group of pictures 1020 thus describes the multiple frames or pictures that comprise a video sequence. Within group of pictures 1020, therefore, there are multiple frames or pictures, such as, for example, frame 1030. Further, within frame 1030 there are also multiple slices (or groups of blocks), such as, for example, slice 1040. Again, within each slice 1040, there are multiple macroblocks, such as, for example, macroblock 1050. Each macroblock 1050 consists of multiple blocks 1060, and correspondingly, each block 1060 consists of multiple pixels 1070.

Figure 6:
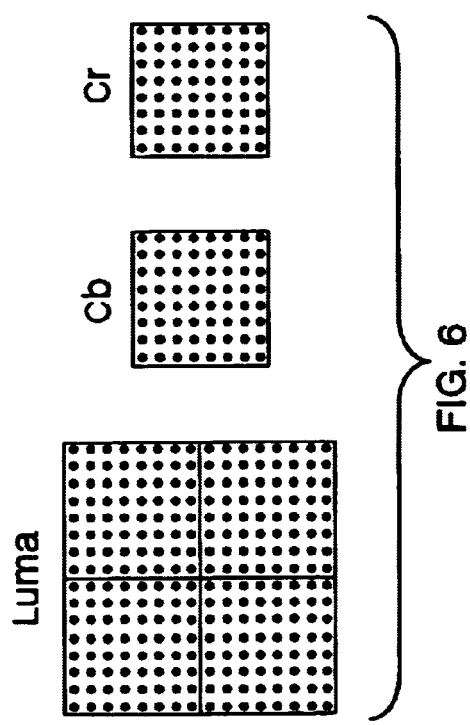
FIG. 6 is a diagram used to explain a sample of the blocks in a macroblock as depicted in FIG. 5.

FIG. 6 illustrates a sample of the blocks in a macroblock. As shown in FIG. 6, a macroblock consists of a 2×2 matrix of blocks representing luminance (or brightness), designated as Y, and 2 chrominance blocks designated as CB (or U) and CR (or V). Each macroblock has a width of 16×16 of Y pixels and corresponding 8×8 blocks of Cb and Cr pixels.

Returning to FIG. 4, source coder 312 codes the macroblocks dynamically, in that each macroblock may be coded differently according to a particular coding control strategy. The H.263 video coding standard does not designate a specific coding control strategy, but the coding control used by source coder 312 must conform to the H.263 standard. Therein, a macroblock enters source coder 312 at video-in 405, and source coder 312 produces five outputs, including inter/intra flag 490, transmitted or not 492, quantization indication 494, q-level 496, and motion vector 498. To produce these outputs from the single video input, source coder 312 utilizes three coding functions including block transformer 410, quantizer 420, and predictor 430. If predictor 430 is utilized as the coding control strategy for source coder 312, the coding mode is referred to as inter-frame coding (INTER). In contrast, if no prediction is applied, the coding mode is referred to as intra-frame coding (INTRA). INTER coding is generally referred to as P-frame coding, while INTRA coding is generally referred to as I-frame coding.

For P-frame coding, predictor 430 implements a coding control computation based on predicting one macroblock by comparison to an earlier macroblock. The computation exploits the inter-frame dependencies of frames (or pictures) to reduce the bit rate. In contrast to the methods consistent with the invention, in P-frame coding, the comparison of one macroblock to another depends on the comparison of a macroblock from one frame to the same positional macroblock in another frame. This prediction process is called ME/C (motion estimation/compensation) prediction, because prediction is inter-picture and may be augmented by motion compensation. The INTRA coding mode can be signaled at the picture level or at the macroblock level. In the optional PB-frames, mode B-pictures are always coded in INTER mode. The B-pictures are partly predicted bidirectionally.

For I-frame coding, the coding of macroblocks depends upon both block transformer 410 and quantizer 420. Block transformer 410 and quantizer 420 implement a coding strategy based on reducing the spatial redundancy in the macroblocks of a frame. One method of block transformation by block transformer 410 begins with "discrete cosine transformation" (DCT), which is used by the H.263 video coding standard. Operating on each 8×8 block within a macroblock, DCT changes the data representing spatial sample values to data representing spatial frequency values, resulting in 64 DCT coefficients (each 8×8 block results in 64 coefficients). Due to the nature of DCT, a concentration of information results for the coefficients in the upper left-hand corner of the macroblock. In addition, the coefficient in the most upper left-hand corner represents the average value of the entire block, called the DC component: the remaining coefficients are referred to as the AC coefficients. Significantly, however, DCT does not reduce the amount of data—DCT only changes the nature of the data from the spatial domain to the frequency domain. The I-frame coding simply represents this DCT data by encoding the data in the frequency domain. After DCT, block transformation occurs pursuant to one or more coding options, as described above. The methods consistent with the present invention relate directly to I-frame coding by replacing the options available for I-frame coding with differential macroblock coding.

After block transformation by block transformer 410, quantizer 420 reduces the amount of data by removing content. Quantization describes the process of approximating each frequency coefficient as one of a limited number of allowed values. For quantization to occur, the values representing the contents of each block within each macroblock are divided by a quantization level (determined by a finite quantization table), which reduces the amplitude of the values and increases the number of zero values. The quantization level used for this computation depends upon the chosen coding control algorithm that attempts to achieve a certain bit rate by manipulating the quantization level assigned to different areas of a picture. By increasing the number of zero values, quantization results in bit-rate reduction as well as reduction in computational complexity.

Obtaining the quantization involves adjusting the number of bits used to represent the 64 DCT coefficients. This adjustment occurs by the creation of a bit stream, generally by run-length encoding and/or entropy encoding. Run-length encoding removes long runs of zero value coefficients, and entropy encoding makes additional adjustments to the quantum of the bit stream based on statistical characteristics, usually based either on Huffman encoding methods or optionally arithmetic encoding methods. In the creation of the bit stream, the DC coefficient represents the difference between the DC coefficient value for that macroblock and the previous DC coefficient. However, the content of the bit stream for the AC coefficient is dynamic in that each macroblock produces a different result during quantization.

After source coder 312 completes the coding of the macroblock, either by P-frame or I-frame coding, the macroblock is further processed through video codec 10. Following this processing, the macroblock is represented by a macroblock layer. In any video sequence, the H.263 standard represents the video as data within various representative layers. For example, data for each picture consists of a picture header followed by data for Group of Blocks, followed by an end-of-sequence code and stuffing bits. Similarly, data for each Group of Blocks (GOB) also consists of a GOB header followed by data for macroblocks. Each GOB contains one or more rows of macroblocks. For the first GOB in each picture (with number 0), no GOB header is transmitted. For all other GOBs, the GOB header may be empty, depending on the encoder strategy. Finally, data for each macroblock consists of a macroblock header followed by data for blocks.

Figure 7:
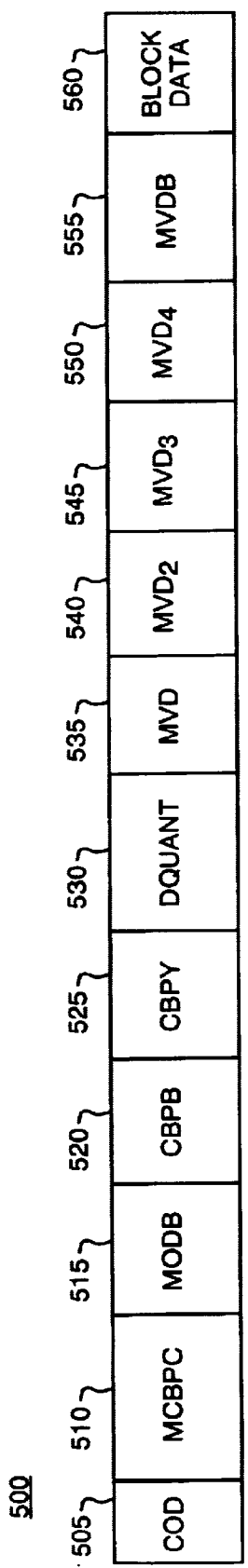
FIG. 7 is a diagram used to explain a sample of the structure of a macroblock layer using the H.263 standard.

FIG. 7 illustrates one embodiment of a macroblock layer 500 produced by source coder 312 depicted in FIG. 4. The macroblock layer 500 comprises coded macroblock indication (COD) 505, macroblock type and coded block pattern for chrominance (MCBPC) 510, macroblock mode for B-blocks (MODB) 515, coded block pattern for B-blocks (CBPB) 520, coded block pattern for illuminessence (CBPY) 525, quantization information (DQUANT) 530, motion vector data (MVD) 535, motion vector data 2 ($MVD_2$) 540, motion vector data 3 ($MVD_3$) 545, motion vector data for ($MVD_4$) 550, motion vector data 4 B-macroblock (MVDB) 555, and block data 560. COD is only present in pictures for which PTYPE indicates "INTER," for each macroblock of the picture. MCBPC is present when indicated by COD or when PTYPE indicates "INTRA." MODB is present for MB-type 0–4 if PTYPE indicates "PB-frame." CBPY, DQUANT, MVD, and $MVD_{2-4}$ are present when indicated by MCBPC and CBPY. $MVD_{2-4}$ are only present in Advanced Prediction mode. MODB, CBPB, and MVDB are only present in PB-frame mode. Thus, as indicated above, although macroblock layer 500 consists of twelve components, the use of any component depends upon the selected coding strategy, that is, whether P-frame or I-frame.

Figure 8:
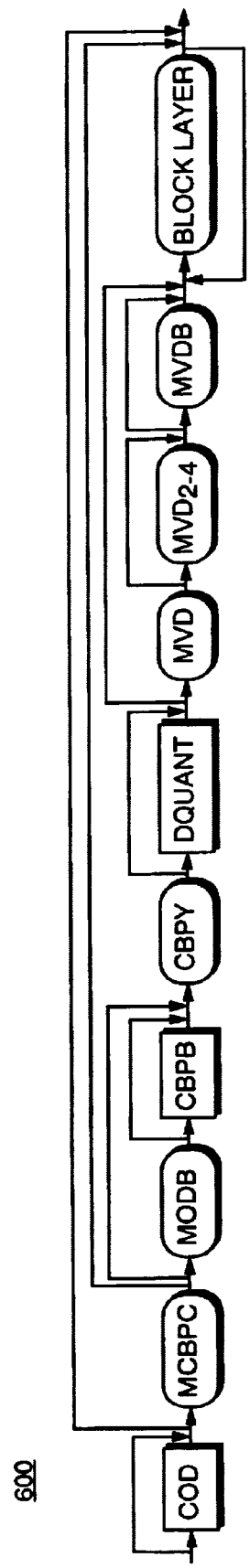
FIG. 8 is a diagram used to explain the standard syntax for the macroblock layer utilizing the H.263 standard.

FIG. 8 illustrates a syntax diagram showing the utilized elements of macroblock layer 500 for various coding strategies. The boxes represent fixed-length entities and the ovals represent variable-length entities. Because H.263 does not require a specific coding strategy, macroblock syntax diagram 600 demonstrates some of the available coding options. For example, COD comprises a single bit. If set to 0, COD signals that the macroblock is coded. If set to 1, COD indicates that no further information is transmitted for this macroblock; in such case, the decoder shall treat the macroblock as an INTER macroblock with motion vector for the whole block equal to zero and with no coefficient data. COD is only present in pictures for which PTYPE indicates "INTER" for each macroblock in these pictures.

MCBPC is a variable length codeword. In MCBPC, the coded block pattern for chrominance signifies $C_B$ and/or $C_R$ blocks when at least one non-INTRADC transform coefficient is transmitted (INTRADC is the dc-coefficient for INTRA blocks). $CBPC_N=1$ if any non-INTRADC coefficient is present for block N, else 0, for $CBPC_5$ and $CBPC_6$ in the coded block pattern. When MCBPC=Stuffing, the remaining part of the macroblock layer is skipped. In this case, the preceding COD=0 is not related to any coded or not-coded macroblock and therefore the macroblock number is not incremented. For pictures coded in INTER mode, multiple stuffings are accomplished by multiple sets of COD=0 and MCBPC Stuffing.

MODB is a variable length codeword. MODB is present for MB-type 0–4 if PTYPE indicates "PB-frame" and indicates whether CBPB is present (indicates that B-coefficients are transmitted for this macroblock) and/or MVDB is present.

CBPB comprises six bits. CBPB is only present in PB-frames mode if indicated by MODB. $CBPB_N=1$ if any coefficient is present for B-block N, else 0, for each bit $CBPB_N$ in the coded block pattern.

CBPY is a variable length codeword, giving a pattern number signifying those Y blocks in the macroblock for which at least one non-INTRADC transform coefficient is transmitted (INTRADC is the dc-coefficient for INTRA blocks). $CBPY_N=1$ if any non-INTRADC coefficient is present for block N, else 0, for each bit $CBPY_N$ in the coded block pattern. For a certain pattern $CBPY_N$, different codewords are used for INTER and INTRA macroblocks.

DQUANT, which defines changes in quantization, comprises 2 bits. QUANT ranges from 1 to 31; if the value for QUANT, after adding the differential value, is less than 1 or greater than 31, it is clipped to 1 and 31 respectively.

MVD is a variable length codeword. MVD is included for all INTER macroblocks (in PB-frames mode also for INTRA macroblocks) and consists of a variable length codeword for the horizontal component followed by a variable length codeword for the vertical component.

$MVD_{2-4}$ are all variable length codewords. The three codewords $MVD_{2-4}$ are included if indicated by PTYPE and by MCBPC, and consist each of a variable length codeword for the horizontal component followed by a variable length codeword for the vertical component of each vector. $MVD_{2-4}$ are only present in Advanced Prediction mode.

MVDB is a variable length codeword. MVDB is only present in PB-frames mode if indicated by MODB and consists of a variable length codeword for the horizontal component followed by a variable length codeword for the vertical component of each vector.

The block layer contains the data representative of the macroblock. If not in PB-frames mode, a macroblock comprises four luminance blocks and one of each of the two color difference blocks. INTRADC is present for every block of the macroblock if MCBPC indicates MB type 3 or 4. TCOEF is present if indicated by MCBPC or CBPY. In PB-frames mode, however, a macroblock comprises twelve blocks. First the data for the six P-blocks is transmitted as in the default H.263 mode, then the data for the six-B-blocks. INTRADC is present for every P-block of the macroblock if MCBPC indicates MB type 3 or 4. INTRADC is not present for B-blocks. TCOEF is present for P-blocks if indicated by MCBPC or CBPY; TCOEF is present for B-blocks if indicated by CBPB.

Method of Operation

Systems consistent with the present invention replace I-frame coding with differential macroblock coding. In contrast to standard I-frame coding, which codes the data in the frequency domain, these systems practice encoding completely in the transform domain. The systems operate in this manner because differential macroblock coding results from the difference between the coding macroblock and one of the reference macroblocks. This improvement results in decreased complexity. In addition, although not the preferred embodiment, other embodiments may incorporate differential macroblock coding in the frequency domain. In fact, coding of the difference in the frequency domain may have some advantage, particularly in the case of local decoding delay or other processing delay with the decoder. Indeed, for an even greater gain in efficiency, an advantage of these methods is that neither DCT for coding nor IDCT (inverse DCT) for decoding is actually required, although they are used in the preferred implementation.

Figure 9:
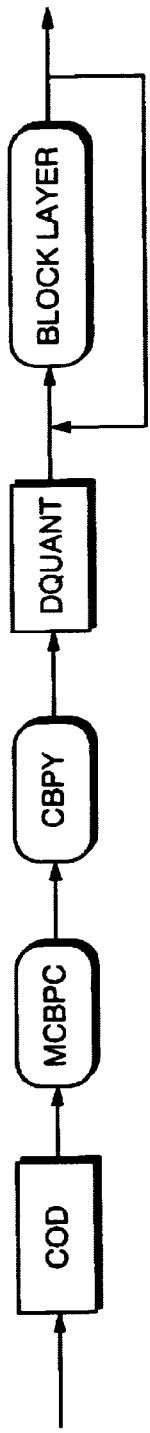
FIG. 9 is a diagram used to explain the syntax for intra-frame coding of a macroblock utilizing the H.263 standard.
Figure 10:
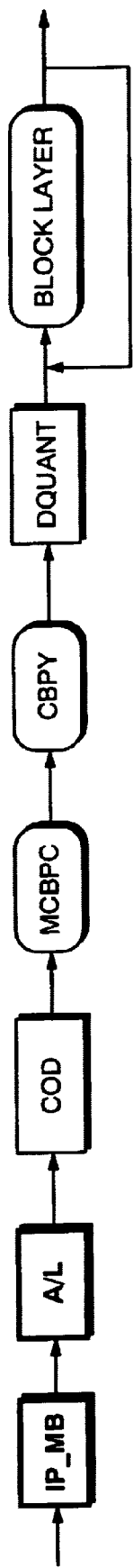
FIG. 10 is a block diagram of an embodiment of the improved syntax for coding a macroblock utilizing the H.263 standard.

FIG. 9 illustrates an embodiment of a macroblock syntax diagram using the standard H.263 coding options for I-frame coding, and FIG. 10 illustrates an embodiment of an improved macroblock syntax diagram for I-frame coding. As shown in FIG. 10, the non-bolded boxes and ovals depict the same coding process for the I-frame coding strategy as shown in FIG. 9. However, FIG. 10 also includes two additional components, including the intra-predicted macroblock (IP_MB) component and the above-left (A/L) decision component. Notably, however, this improved approach incorporates no structural change to either the GOB or the frame (or picture).

As described in the preceding section, the H.263 standard utilizes a standard methodology for I-frame encoding of macroblocks. In this improved approach, however, the coding of I-frames allows for a substantial reduction in spatial redundancy by macroblock comparison and differential macroblock coding. In one implementation, during the encoding for each macroblock, the coding macroblock is compared with at least two other reference macroblocks. Based on this comparison, a specific encoding decision is made. If the comparison results in a small difference between the coding macroblock and one of the reference macroblocks, only the lowest difference is encoded. In comparison to the standard I-frame format, this improved methodology for I-frame coding results in substantial improvements in efficiency. In contrast, if the difference is great and not low, the macroblock may still be coded in the standard I-frame format using the standard methodologies.

Systems consistent with the present invention compare the coding macroblock with adjacent macroblocks, that is, with the macroblock to its immediate left and the macroblock immediately above. According to these systems, if the difference is to be encoded, the two additional components depicted in FIG. 10 are useful additions to the macroblock layer. The first of these additional components, or the IP_MB, designates whether the difference of a macroblock is coded, or whether the macroblock is coded by standard I-frame coding. IP_MB is preferably a one-bit component, whereby IP_MB equals zero if the standard I-frame format is used, and IP_MB equals one if differential macroblock coding is used. Similarly, the A/L component designates the reference macroblock for the difference computation. If IP_MB equals one, and if the difference is based on the macroblock to the left of the macroblock to be coded, A/L equals zero. Similarly, if IP_MB equals one, and if the difference is based on the macroblock above the macroblock to be coded, A/L equals one. Of course, macroblocks other than the macroblock to the left and the macroblock above the coding macroblock may also be used for comparison. Yet, the comparison macroblock only references two earlier macroblocks, so that reference bit A/L only comprises a one-bit component. If other macroblocks were used for comparison, A/L would possibly require more than one bit.

Figure 11:
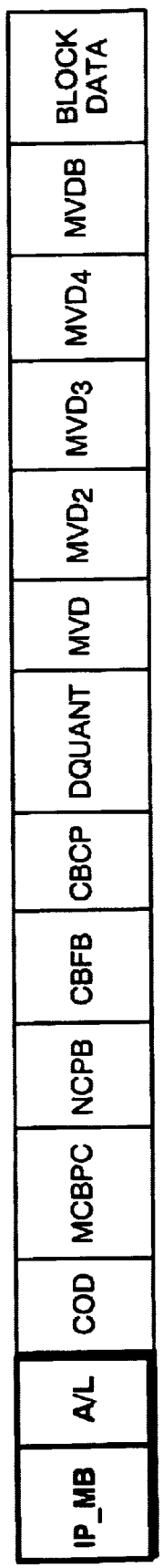
FIG. 11 is a block diagram of an embodiment of the improved structure for the macroblock layer utilizing the H.263 standard.

FIG. 11 illustrates an improved macroblock layer representative of the macroblock syntax diagram shown in FIG. 10. The improved macroblock layer comprises the same components as shown in FIG. 7, plus two additional components, IP_MB and A/L. FIG. 11 designates these additional components by bolded boxes. Other changes in the content of the macroblock are also contemplated by systems consistent with this invention. For example, when a macroblock is identified as coded (that is, when the COD (coded macroblock indication) equals 0), the DC components of all the blocks in the macroblock are variable-length coded, even if the blocks contain zero values. Also, a block is identified as coded when at least one AC coefficient of the block is coded, and if a block is indicated as not coded, only the DC value is coded.

Illustration of Operation

Figure 12:
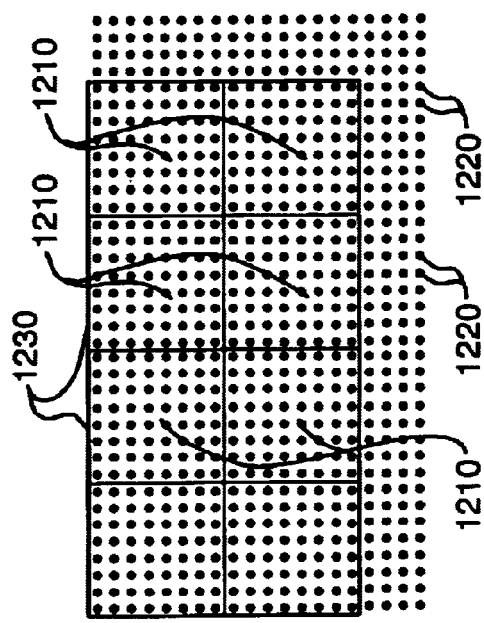
FIG. 12 is a-diagram used to explain a sample of the arrangement of blocks in a macroblock from a slice from the picture shown in FIG. 5.

FIG. 12 illustrates a sample of the arrangement of blocks and macroblocks in a portion of a slice from a frame. Blocks 1210 depict various blocks within macroblocks 1230. Each block contains an 8-pixel by 8-lines set of pixels, and each macroblock contains four blocks, plus the two chrominance blocks, CB and CR. Pixels 1220 illustrate the single pixels that comprise blocks 1210.

Figure 13:
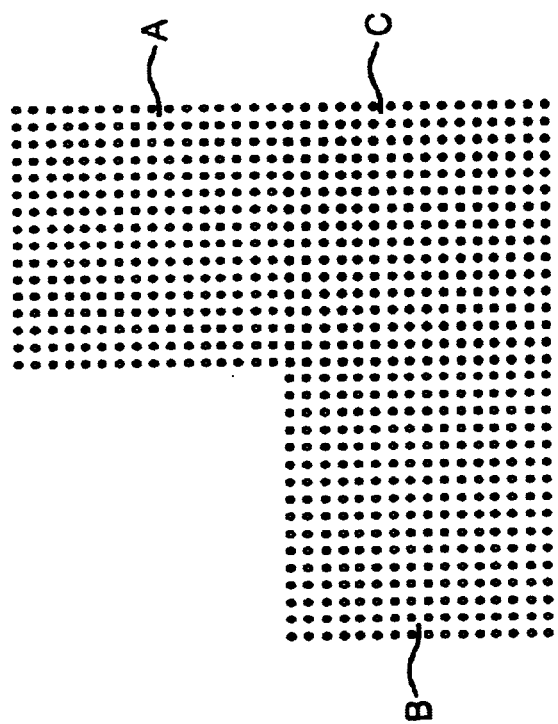
FIG. 13 is a diagram of three macroblocks arranged with one macroblock beside another macroblock and under another macroblock.

FIG. 13 illustrates three macroblocks a, b, and c arranged with one macroblock b beside another macroblock c under another macroblock a. As described above, the structure of FIG. 13 describes the relational position of macroblocks for the operation of a preferred embodiment of the claimed invention. Thus, the coding macroblock c (illustrated with filled pixel circles) is situated with another macroblock b to its immediate left and another macroblock a immediately above (illustrated with open pixel circles).

Figure 14:
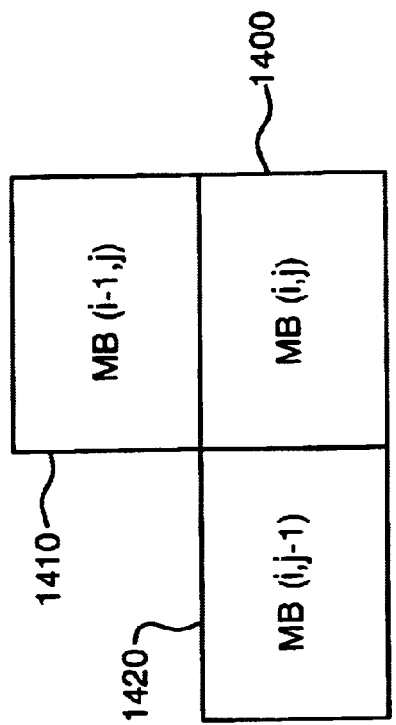
FIG. 14 is a block diagram of the three comparison macroblocks of FIG. 13.

FIG. 14 illustrates a block diagram of the macroblocks in FIG. 13. Additionally, FIG. 14 depicts a formula for determining the location of the reference macroblocks. Macroblock 1400 (representative of macroblock c from FIG. 13) represents the coding macroblock. Macroblock 1410 (representative of macroblock a from FIG. 13) depicts the macroblock above coding macroblock 1400, and macroblock 1420 (representative of macroblock b from FIG. 13) depicts the macroblock to the left of coding macroblock 1400. The formula depicted in FIG. 14 determines the location of these reference macroblocks. For example, if a comparison is made between macroblock 1400 and macroblock 1410, the reference macroblock exists at location i–1, thus above the coding macroblock. Notably, if the coding macroblock originates from first slice of a picture, there would be no macroblock immediately above for comparison. Thus, the formula is (i–1, j) if i>0. If no macroblock exists at location i–1 for comparison (that is, if i=0), then the macroblock at location j–1 is used. Similarly, if a comparison is made between macroblock 1400 and macroblock 1420, the reference macroblock exists at location j–1, thus to the left of the coding macroblock. Notably, if the macroblock to be coded originates from the left column of a picture, no macroblock would exist at location j–1 for comparison. So, the formula is (i, j–1) if j>0. If no macroblock exists at location j–1 for comparison (that is, if j=0), then the macroblock at location i–1 is used. Using this approach, note that the first macroblock of each picture will not benefit from this improved methodology of differential macroblock coding, because no comparison macroblock exists either above or to the left of that initial coding macroblock.

Notably, the methodology for determining the location of the reference macroblock for differential macroblock coding somewhat approximates P-frame coding, in that both forms of coding generally utilize a macroblock as the unit of prediction. However, as described in the preceding paragraph, differential macroblock coding locates the reference macroblock dramatically different from P-frame coding and, thus, avoids possible timing problems within the in-time availability of data for P-frame coding, where the prediction occurs in the spatial domain.

Figure 15:
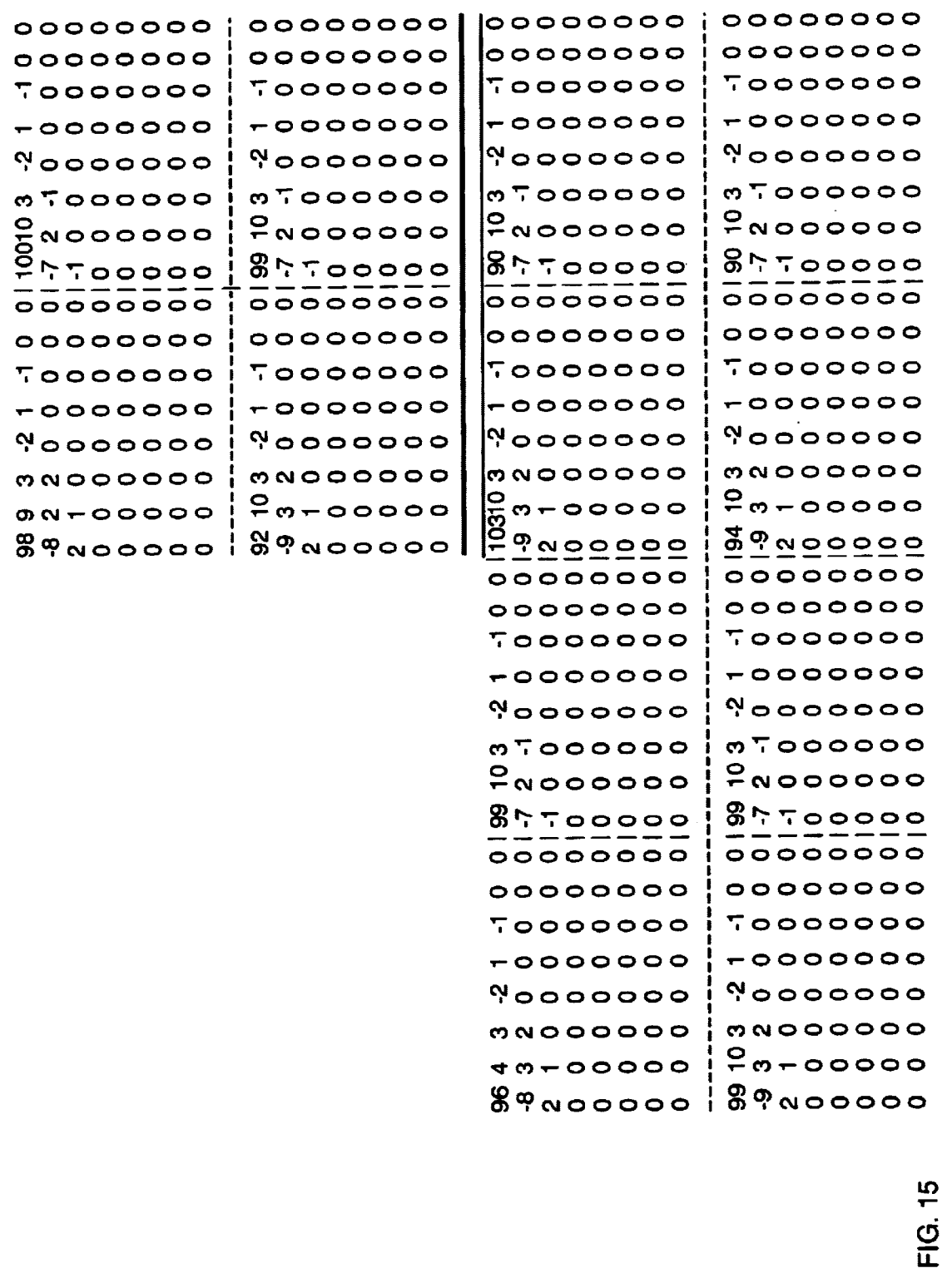

FIG. 15 illustrates a sample of the DCT values contained within three macroblocks, arranged in the configuration of FIGS. 13–14 . As shown in FIG. 15, each block of each macroblock contains numerical representations for the pixels. Significantly, the upper left-hand corner of each block contains the DC component, with a numerical representation of the average value for all the pixel values within the block. The coding macroblock, for example, contains four DC components, including 103, 90, 94 and 90, representative of the four blocks within this macroblock. The macroblock above the coding macroblock also contains four DC components, including 98, 100, 92, and 99. The macroblock to the left of the coding macroblock also contains four DC components, including 96, 99, 99, and 99. Systems consistent with the present invention take a difference between the coding macroblock and these two reference macroblocks. The difference with the smallest value represents the value to be used for encoding of the coding macroblock according to systems consistent with the invention.

Figure 16B:
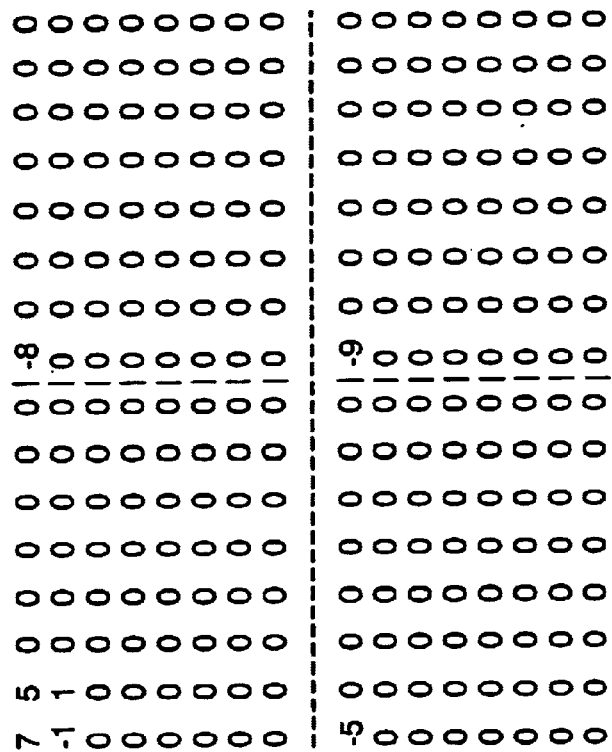
FIGS. 16A and 16B are diagrams of macroblocks after computation of a difference with the other macroblocks depicted in FIG. 15.
Figure 16A:
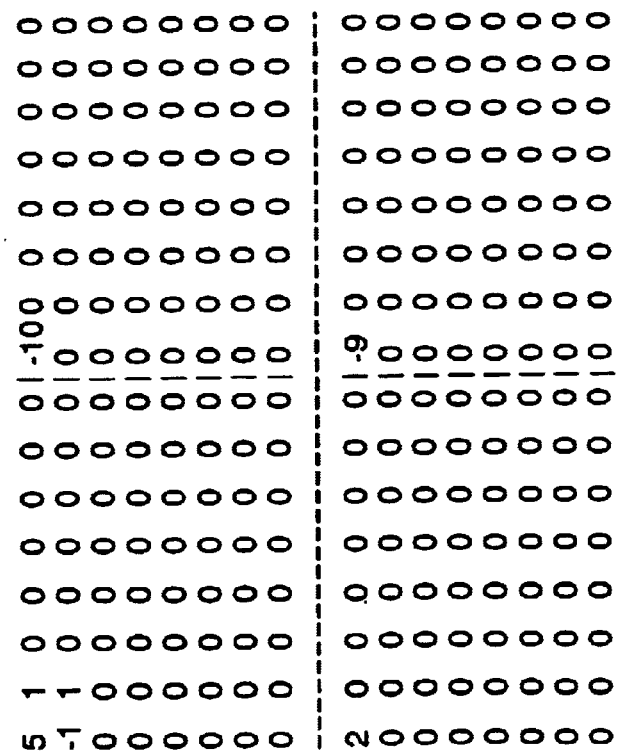

FIGS. 16A and 16B illustrate macroblocks after computation of the difference between the coding macroblock and the two reference macroblocks as depicted in FIG. 15. FIG. 16A depicts the coding macroblock of FIG. 15, after computation of the difference with the macroblock above (that is, macroblock 1410). As shown in FIG. 16A, the DC components are 5, –10, 2, and –9. FIG. 16B depicts the coding macroblock 1400 of FIG. 15, after computation of the difference with the macroblock to the left (that is, macroblock 1420). As shown in FIG. 16B, the DC components are 7, –8, –5, and –9. At this point, the lowest difference is selected and a determination is made whether to code the coding macroblock with the difference in conformity with these methods or to code the coding macroblock in the standard I-frame format. In the example of FIGS. 16A and 16B, the average difference of 16A is –12 (that is, 5+(–10)+2+(–9)), and the average difference of 16B is –15 (that is, 7+(–8)+(–5)+(–9)). Accordingly, if a difference is to be coded, the difference would be used between the coding macroblock (that is, macroblock 1400) and the macroblock above (that is, macroblock 1410), here, as illustrated by the difference of FIG. 16A.

Continuing with the above illustration, using the coding methodology based on FIG. 16A, the contents of the pertinent portions of the macroblock layer may be depicted, as shown in FIG. 11. The pertinent portions of the macroblock layer for purposes of systems consistent with the invention include the components listed in FIG. 10, including IP_MB, A/L, COD, MCBPC, CBPY, DQUART, and the Block Layer. Using the above information, IP_MB=1 because the methods of the invention are used for coding, and A/L=1 because the macroblock above the coding macroblock contains the lowest difference. The COD (coded macroblock indication) indicates whether the macroblock is coded; if coded, COD=0, and if not coded COD=1. Notably, in contrast to the IP_MB component, which indicates the type of coding, either I-frame coding or improved I-frame coding as disclosed by the methods of the invention, the COD component indicates if the macroblock is coded or not by any form of macroblock coding. The MCBPC (macroblock type and coded block pattern for chrominance) indicates the coded block pattern for chrominance. In contrast to the IP_MB, A/L, and COD, which are one-bit, fixed-length components, MCBPC is a variable-length component, the contents of which depends upon the relationship of the coded block pattern to a variable length code (VLC) table. The CBPY (coded block pattern for illuminessence) indicates the luminance blocks that are coded. Like MCBPC, CBPY is a variable-length component, which also depends upon a VLC table. The DQUANT (quantization information) indicates any change in the quantization. DQUANT comprises a two-bit, fixed-length code, ranging from a differential value of −2(01) to 2 (11). Finally, the variable-length block layer contains the data.

In the preceding paragraph, several components of the macroblock layer rely on a VLC table. There is no single VLC table for application in all circumstances, but perhaps the most common VLC table is the transform coefficient (TCOEF) VLC table, as recognized by the H.263 standard. Generally, a VLC table contains codewords in a table without a fixed length and the length of any predetermined codewords depends on the coefficient value. Indeed, for purposes of experimentation in the next section, this VLC table is used for all applications. Applying this table, the DC component of each block is assigned a specific codeword, in the range of values from 0 to 101. Further, a special representation is used for any absolute value layer than 101. Notably, this VLC table is not necessarily optimum, but for purposes of comparison (in the following section) the table provides a baseline. Still, other VLC tables can be designed that provide a better match for the contents of the blocks for a particular application.

As referenced above, the above description illustrates one of many embodiments for implementing the methods disclosed in this invention. For example, reference macroblocks other than the macroblock to the left and above the coding macroblock may be used. Similarly, more than two reference macroblocks can be used, similar to ME/C in P-frame coding. The above-described preferred embodiment discloses two reference macroblocks based on limiting the size of the IP_MB and A/L components to a single bit for greater efficiency, but if the number of bits are increased in these components to represent additional pointing vectors, then more than two reference macroblocks may be used.

CONCLUSION

Systems consistent with the present invention provide for a more efficient I-frame coding technique for video conferencing. These systems provide for greater efficiency by differential macroblock coding. This coding methodology provides many advantages over the current H.263 coding standard, as utilized by the H.324 video conferencing standard.

Systems consistent with the present invention utilize the structure of the H.324 video conferencing standard as well as the structure of the H.263 video coding standard. Indeed, one purpose of these methods entails gaining greater efficiency and thus greater speed for video compression. On first impression, the coding efficiency of data subject to I-frame coding may be considered unimportant, because any gains in efficiency would only occur in the initiation phase of the video compression process. However, in cases of noisy-channel environments, the coding efficiency becomes much more significant, due to the requirement of the retransmission for corrupted data. In determining the improved efficiency of the methods of this invention, the five picture formats supported by H.263 are considered for comparison to the standard forms of video compression.

The H.263 video coding standard improved upon the H.261 standard. The H.261 standard supported the QCIF and CIF picture formats. H.263 continues support for these formats, plus H.263 also supports the SQCIF, 4CIF, and 16CIF formats. As the original picture formats, the QCIF and CIF formats comprise somewhat lower resolution formats. Nevertheless, SQCIF is approximately half the resolution of QCIF. However, 4CIF and 16CIF are 4 and 16 times the resolution of CIF, respectively. In comparing the efficiency of these various picture formats, practitioners in the art of video compression generally recognize a number of standard video sequences for conducting comparisons of one compression method to another. For QCIF, these comparison sequences include Carphone, Clair, Foreman, Miss America, Mother & Daughter, and Salesman, and for 4CIF, these comparison sequences include Akiyo, Coast Guard, and Container Ship. The following comparisons of systems consistent with the present invention with the standard I-frame coding technique utilize these sequences for comparison, using quantization values in the range 2 to 23. Notably, these same comparisons are the test sequences generally used to measure the performance of the coding algorithms for H.263+(and H.263++) and MPEG-4.

In the following comparisons, only the first frame of each sequence is coded according to the methods of the invention. This is fortunate for purposes of comparison, because the quantization error produced will be the same as that error produced using standard H.263 video coding, using the same quantization levels. Accordingly, the exact same video is produced by either the coding methods of the invention or standard I-frame coding using the H.263 standard. Therefore, the only difference between the two coding techniques is the number of bits required to achieve the exact same result. As illustrated by the following comparisons, the coding methods consistent with the invention always result in some gain in coding efficiency (that is, a lower number of bits for coding), the level of which depends upon the specific frame and the indicated quantization level. As additionally illustrated by the following comparisons, the coding methods almost always result in a more efficient coding strategy than the standard I-frame coding methodologies.

FIG. 17 is a table describing the results of coding comparison frames for simulations using the methods of the invention. The results are based on simulations using the six QCIF sequences (Carphone, Clair, Foreman, Miss America, Mother & Daughter and Salesman) and the three 4CIF sequences (Akiyo, Coast Guard and Container Ship). Although the simulations were based on quantization values in the range of 2–23, the results depicted in FIG. 17 are only for sequences where the quantization value equaled 10. The quantization level of 10 corresponds to a fairly good visual quality for a coding methodology. The values shown in the table represent the percentage savings in the number of bits required to code the frame with the methods of the invention as compared to standard H.263 coding, that is, standard I-frame coding. As shown in FIG. 17, the Akiyo sequence resulted in a 30.51% savings, the Coast Guard sequence resulted in a 4.72% savings, the Container sequence resulted in a 15.65% savings, the Carphone sequence resulted in a 6.06% savings, the Clair sequence resulted in a 28.07% savings, the Foreman sequence resulted in a 3.53% savings, the Miss America sequence resulted in a 16.65% savings, the Mother & Daughter sequence resulted in a 4.24% savings, and the Salesman sequence resulted in a 2.50% savings. Therefore, for the four CIF sequences, the results ranged from a 5% to 30% savings, and for the QCIF sequences, the results ranged from a 2.5% to 28% savings.

FIG. 18 illustrates a further example of the savings in the number of bits required to code a frame with methods consistent with the present invention as compared to the standard I-frame video coding. As shown in FIG. 18, the results are based on simulations using two 4CIF sequences (Akiyo and Coast Guard). In contrast to FIG. 17, FIG. 18 depicts the savings in bits achieved by the methods of the invention as a function of the level of quantization. As shown in FIG. 18, the savings is less for small quantization levels but increases as the quantization level increases. For example, for a quantization level of 2 in the Akiyo sequence, the level of savings is 8.1%, but for a quantization of 23 in the Akiyo sequence, the level of savings is 38.2%. For purposes of illustration, FIG. 18 uses only the Akiyo and the Coast Guard sequences, but this correlation of the level of savings in bits to the increase in the quantization level is consistent for all of the QCIF and 4CIF sequences. Significantly, using the methods consistent with the present invention, this increase in the level of savings is expected with the increase of the quantization level, because a greater quantization level represents an allowance of more distortion in the sequence, and if more distortion is allowed within a macroblock, the difference between one macroblock to another is significantly reduced.

Figure 19:
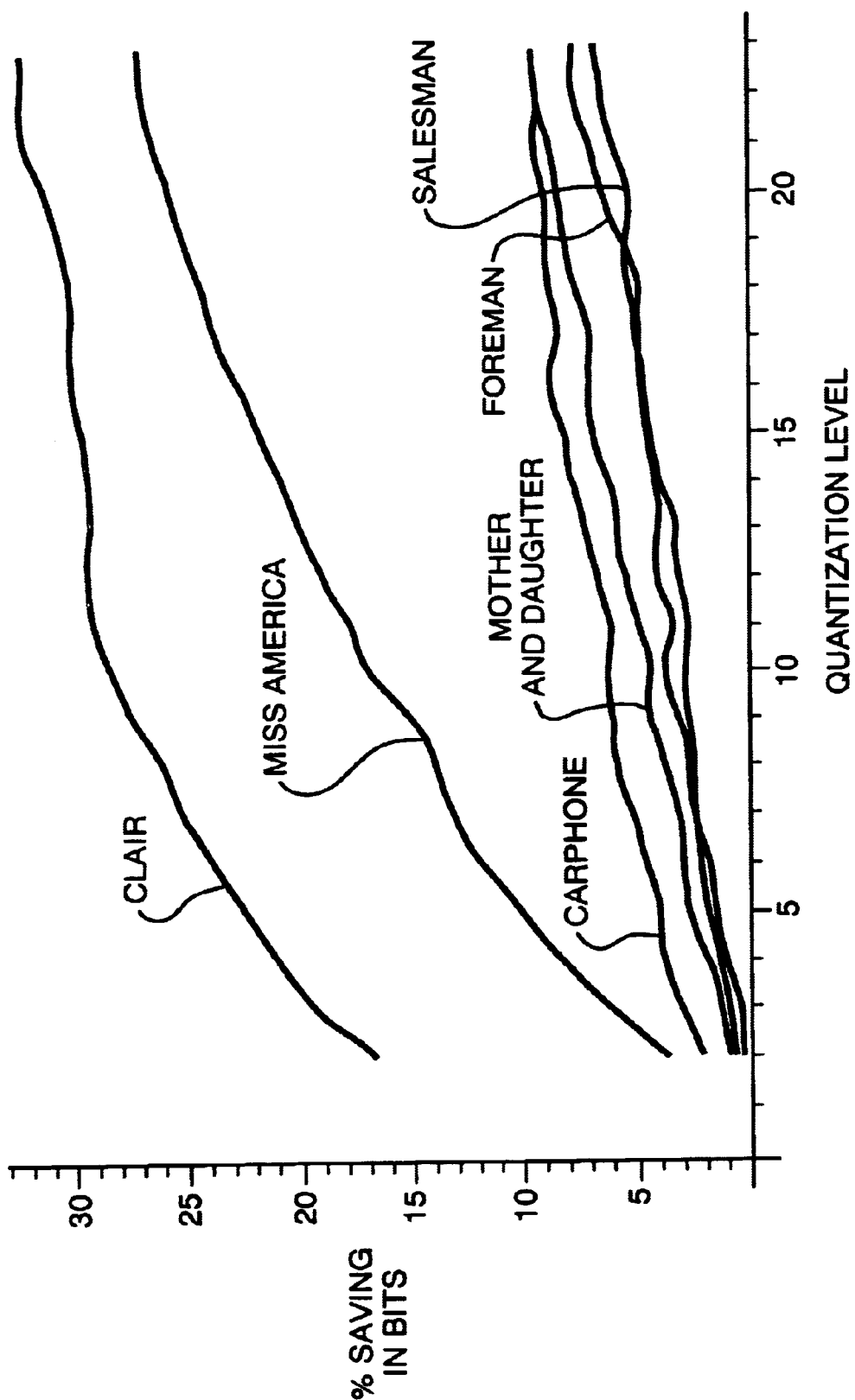
FIG. 19 is a graph depicting the efficiency improvement gained by the claimed macroblock coding technique.

FIG. 19 illustrates a comprehensive representation of the level of savings in bits for QCIF sequences when using the disclosed coding methods as compared to standard I-frame video coding. FIG. 19 represents the same result as depicted in FIG. 18, except that FIG. 19 charts the level of savings in bits for each of the six QCIF sequences, over the range of quantization levels 2 through 23. As shown in FIG. 19, just as in FIG. 18, the level of savings in bits rises with the increase in the level of quantization.

Figure 20:
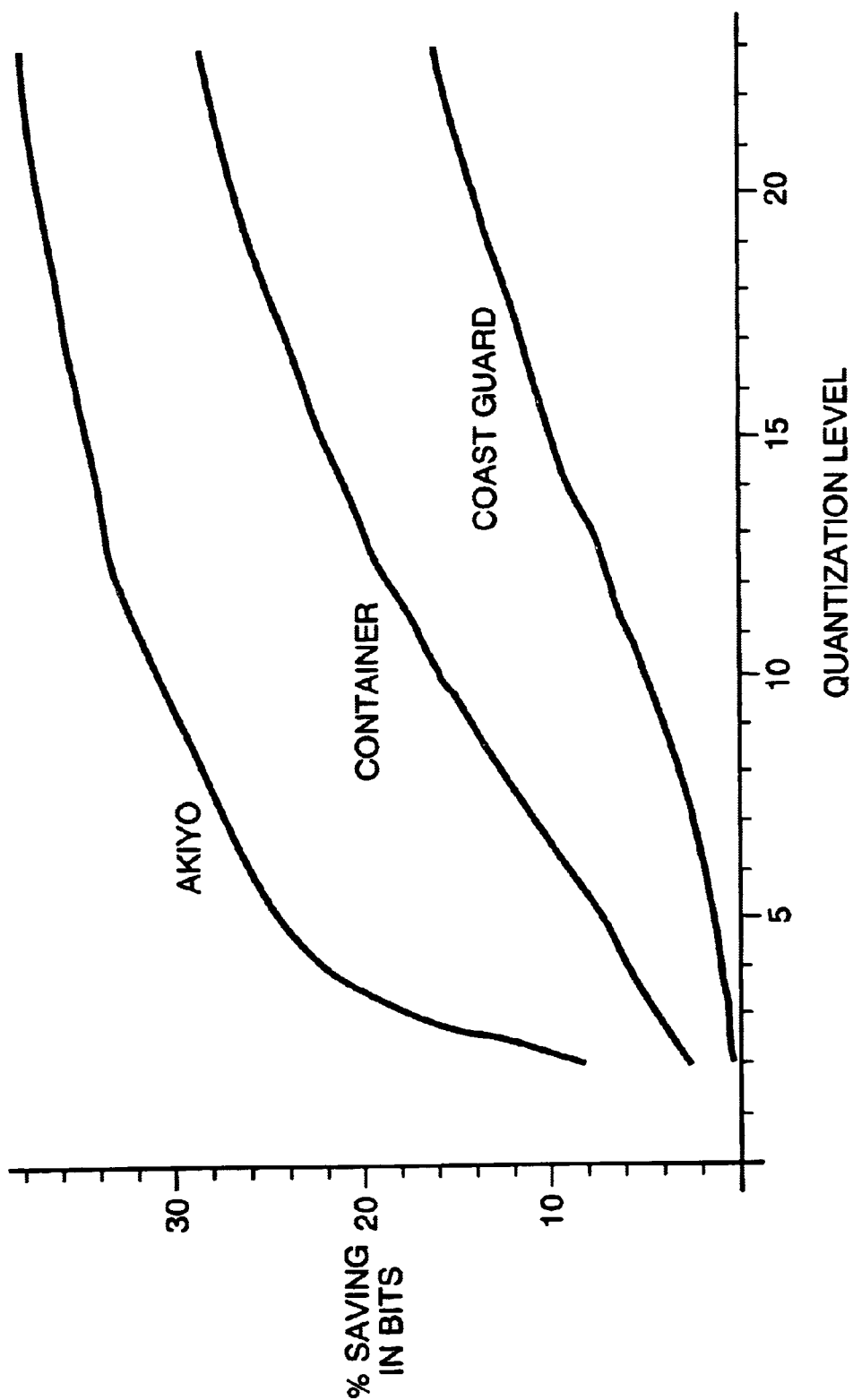
FIG. 20 is another graph depicting the efficiency improvement gained by the claimed macroblock coding technique.

FIG. 20 further illustrates an example of the savings in bits for 4CIF sequences when using the methods consistent with the present invention as compared to standard H.263 video coding. FIG. 20 represents the same result as depicted in FIG. 18, except that FIG. 20 charts the level of savings in bits for each of the three 4CIF sequences, over the range of quantization levels 2 through 23. As shown in FIG. 20, just as in FIG. 19 for QCIF sequences, the savings in bits rises with the increase in the level of quantization. FIG. 20 also depicts a better performance for 4CIF sequences than for QCIF sequences. This increase in the level of savings is expected for 4CIF sequences over QCIF sequences due to the lower level of correlation in the 4CIF sequences for macroblock comparison, even though these 4CIF sequences entail an overall total higher resolution. This result occurs because the lower resolution sequences contain lower correlation when making comparisons of macroblocks.

The above examples and illustrations of the advantages of using methods consistent with the present invention over the related art are not meant to limit application of the invention to macroblock comparison. Indeed, as explained in the preceding sections, the methods consistent with the present invention may use not only macroblocks but may also use blocks or GOBs (or slices) for differential comparison. In fact, these methods would possibly perform better using blocks as the basis for the differential calculation, but the timing issues would become more critical. Also, these methods are also not limited to video coding for each reference subject, that is, for each frame. Indeed, in an alternative embodiment for applications where video coding is needed only for the segments of a frame that are to be retransmitted, such as, for example, due to noisy channel environments, the methods could only be used for those frames chosen for transmission (for example, the ARQ in the H.324 standard). Further, yet another embodiment for these types of special applications requiring video coding includes those using low frame-rate transmissions, such as, for example, security or monitoring systems with video sequences with a small temporal correlation.

As described above, it will be apparent to those skilled in the art that various modifications and variations can be made in the processes of the present invention without departing from the spirit or scope of the invention. Thus, it is intended that the present invention cover the modifications and variations of this invention provided they come within the scope of the appended claims and their equivalents. In this context, equivalents means each and every implementation for caring out the functions recited in the claims, even if not explicitly described herein.

What is claimed is:

1. A method of data compression for intra-frame coding with an intra-frame, comprising the steps, performed by a processor, of:

receiving a plurality of macroblocks from a single frame;

selecting one of the macroblocks from the frame;

determining a difference between the selected macroblock and at least one other macroblock from the same frame in an adjacent positional relationship to the selected macroblock; and encoding the selected macroblock based on the difference without reference to any predicted frame to reduce spatial redundancy in the intra-frame coding, wherein the step of encoding the selected macroblock based on the difference includes the substep of assigning a difference bit designating that the selected macroblock is encoded with the difference.

2. The method according to claim 1, wherein the step of encoding the selected macroblock based on the difference further includes the substep of assigning a reference bit designating the location of the macroblock against which the difference is determined.

3. The method according to claim 1, wherein the encoding step is avoided, if an insubstantial difference exists between the s elected macroblock and the other macroblock.

4. The method according to claim 1, wherein the step of determining a difference between the selected macroblock and at least one other macroblock further includes the substep of using the macroblock to the immediate left of the selected macroblock.

5. The method according to claim 1, wherein the step of determining a difference between the selected macroblock and at least one other macroblock further includes the substep of using the macroblock above the selected macroblock.

6. The method according to claim 1, wherein the step of determining a difference between the selected macroblock and at least one other macroblock further includes the substep of using the macroblock to the immediate left of the selected macroblock and using the macroblock above the selected macroblock.

7. A system for data compression for intra-frame coding with an intra-frame, comprising:

a receiving component configured to receive a plurality of macroblocks from a single frame;

a selecting component configured to select one of the macroblocks from the frame;

a determining component configured to determine a difference between the selected macroblock and at least one other macroblock from the same frame in an adjacent positional relationship to the selected macroblock;

an encoding component configured to encode the selected macroblock based on the difference without reference to any predicted frame to reduce spatial redundancy in the intra-frame coding, wherein the encoding component includes a difference assigning component configured to assign a difference bit designating that the selected macroblock is encoded with the difference.

8. The system of claim 7, wherein the encoding component includes a location assigning component configured to assign a reference bit designating the location of the macroblock against which the difference is determined.

9. The system of claim 7, wherein the encoding component is avoided, if an insubstantial difference exists between the selected macroblock and the other macroblock.

10. The system of claim 7, wherein the determining component includes a left using component configured to use the macroblock to the immediate left of the selected macroblock.

11. The system of claim 7, wherein the determining component includes an above using component configured to use the macroblock above the selected macroblock.

12. The system of claim 7, wherein the determining component includes a first using component configured to use the macroblock to the immediate left of the selected macroblock and a second using component configured to use the macroblock above the selected macroblock.

13. A method of data compression for intra-frame coding with an intra-frame, comprising the steps, performed by a processor, of:

storing in an encoding system a first macroblock from a single frame;

storing in the encoding system a second macroblock from the same frame;

receiving from the encoding system a coding macroblock from the same frame in an adjacent positional relationship to the first macroblock and a second macroblock;

determining a first difference between the first macroblock and the coding macroblock;

determining a second difference between the second macroblock and the coding macroblock;

coding the coding macroblock with the lowest difference without reference to any predicted frame to reduce spatial redundancy in the intra-frame coding;

assigning a difference bit designating that the coding macroblock is encoded with the difference; and assigning a reference bit designating the location of the macroblock with the lowest difference.

14. The method according to claim 13, wherein the encoding system utilizes the H.324 video conferencing standard.

15. The method according to claim 13, wherein the encoding system utilizes the H.263 video coding standard.

16. The method according to claim 13, wherein the encoding system utilizes the H.263+ video coding standard.

17. The method According to claim 13, wherein the encoding system utilizes the H.263++ video coding standard.

18. The method according to the claim 13, wherein the encoding system utilizes the MPEG-2 video coding standard.

19. The method according to the claim 13, wherein the encoding system utilizes the MPEG-4 video coding standard.

20. The method according to claim 13, wherein the coding step is avoided, if an insubstantial difference exists between the second macroblock and the first macroblock.

21. The method according to claim 13, wherein the step of storing in the encoding system a first macroblock further includes the substep of using the macroblock to the immediate left of the coding macroblock as the first macroblock.

22. The method according to claim 13, wherein the step of storing in the encoding system a second macroblock further includes the substep of using the macroblock above the coding macroblock as the second macroblock.

23. The method according to claim 13, wherein the step of storing in the encoding system a first macroblock further includes the substep of using the macroblock to the immediate left of the coding macroblock as the first macroblock; and wherein the step of storing in the encoding system a second macroblock further includes the substep of using the macroblock above the coding macroblock as the second macroblock.

24. A system for data compression for intra-frame coding with an intra-frame, comprising:

a first storing component configured to store in an encoding system a first macroblock from a single frame;

a second storing component configured to store in the encoding system a second macroblock from the same frame;

a receiving component configured to receive from the encoding system a coding macroblock from the same frame in an adjacent positional relationship to the first macroblock and a second macroblock;

a first determining component configured to calculate a first difference between the first macroblock and the coding macroblock;

a second determining component configured to calculate a second difference between the second macroblock and the coding macroblock;

coding the coding macroblock with the lowest difference without reference to any predicted frame to reduce spatial redundancy in the intra-frame coding;

a first assigning component configured to assign a difference bit designating that the coding macroblock is encoded with the difference; and a second assigning component configured to assign a reference bit designating the location of the macroblock with the lowest difference.

25. The system of claim 24, wherein the encoding system utilizes the H.324 video conferencing standard.

26. The system of claim 24, wherein the encoding system utilizes the H.263 video coding standard.

27. The system of claim 24, wherein the encoding system utilizes the H.263+ video coding standard.

28. The system of claim 24, wherein the encoding system utilizes the H.263++ video coding standard.

29. The system of claim 24, wherein encoding system utilizes the MPEG-2 video (coding standard.

30. The system of the claim 24, wherein the encoding system utilizes the MPEG-4 video (coding standard.

31. The system of claim 24, wherein the encoding component is avoided, if an insubstantial difference exists between the second macroblock and the first macroblock.

32. The system of claim 24, wherein the first storing component includes a first using component configured to use the macroblock to the immediate left of the coding macroblock as the first macroblock.

33. The system of claim 24, wherein the second storing component includes a second using component configured to use the macroblock above the coding macroblock as the second macroblock.

34. The system of claim 24, wherein the first storing component includes a first using component configured to use the macroblock to the left of the coding macroblock as the first macroblock; and wherein the second storing component includes a second using component configured to use the macroblock above the coding macroblock as the second macroblock.

35. A method of coding and decoding for intra-frame coding and decoding with an intra-frame, comprising the steps, performed by a processor, of:
  encoding a coding macroblock from a single frame without reference to any predicted frame to reduce spatial redundancy in the intra-frame coding based on a difference between the coding macroblock and a reference macroblock from the same frame in an adjacent positional relationship to the selected macroblock, wherein the step of encoding a coding macroblock includes the substep of
    assigning a difference bit designating that the coding macroblock is encoded with the difference; and
    decoding the coding macroblock based on the difference between the coding macroblock and the reference macroblock.

36. The method according to claim 35, wherein the step of encoding a coding macroblock based on a difference between the coding macroblock and a reference macroblock further includes the substep of
  assigning a reference bit designating the location of the reference macroblock.

37. The method according to claim 35, wherein the step of decoding the coding macroblock based on the difference between the coding macroblock and the reference macroblock further includes the substep of
  storing a difference bit designating that the coding macroblock is encoded with the difference.

38. The method according to claim 35, wherein the encoding step is performed when a substantial difference exists between the coding macroblock and the reference macroblock.

39. The method according to claim 35, wherein the step of encoding a coding macroblock based on a difference between the coding macroblock and a reference macroblock further includes the substep of
  using the macroblock to the immediate left of the coding macroblock as the reference macroblock.

40. The method according to claim 35, wherein the step of encoding a coding macroblock based on a difference between the coding macroblock and a reference macroblock further includes the substep of
  using the macroblock above the coding macroblock as the reference macroblock.

41. The method according to claim 35, wherein the step of encoding a coding macroblock based on a difference between the coding macroblock and a reference macroblock further includes the substep of
  using the macroblock to the immediate left of the coding macroblock as a first reference macroblock and using the macroblock above the coding macroblock as a second reference macroblock.

42. The method according to claim 36, wherein the step of decoding the coding macroblock based on the difference between the coding macroblock and the reference macroblock further includes the substep of
  storing a reference bit designating the location of the reference macroblock.

43. A system for coding and decoding for intra-frame coding and decoding with an intra-frame, comprising:
  an encoding component configured to encode a coding macroblock from a single frame without reference to any predicted frame to reduce spatial redundancy in the intra-frame coding based on a difference between the coding macroblock and a reference macroblock from the same frame in an adjacent positional relationship to the coding macroblock,
  wherein the encoding component includes
    a first assigning component configured to assign a difference bit designating that the coding macroblock is encoded with the difference; and
    a decoding component configured to decode the coding macroblock based on the difference between the coding macroblock and the reference macroblock.

44. The system of claim 43, wherein the encoding component includes a second assigning component configured to assign a reference bit designating the location of the reference macroblock.

45. The system of claim 43, wherein the decodings component includes a first storing component configured to store a difference bit designating that the coding macroblock is encoded with the difference.

46. The system of claim 43, wherein the encoding component is avoided, if an insubstantial difference exists between the coding macroblock and the reference macroblock.

47. The system of claim 43, wherein the encoding component includes a first using component configured to use the macroblock to the immediate left of the coding macroblock as the reference macroblock.

48. The system of claim 43, wherein the encoding component includes a second using component configured to use the macroblock above the coding macroblock as the reference macroblock.

49. The system of claim 43, wherein the encoding component includes a first using component configured to use the macroblock to the immediate left of the coding macroblock as a first reference macroblock and a second using component configured to use the macroblock above the coding macroblock as a second reference macroblock.

50. The system of claim 44, wherein the decoding component includes a second storing component configured to store a reference bit designating the location of the reference macroblock.

51. A method of encoding for intra-frame coding with an intra-frame, comprising the steps, performed by a processor, of:
  storing a reference macroblock from a single frame;
  receiving a coding macroblock to be coded from the same frame in an adjacent positional relationship to the reference macroblock;
  determining a difference between the coding macroblock and the reference macroblock; and
  encoding the coding macroblock based on the difference without reference to any predicted frame to reduce spatial redundancy in the intra-frame coding,
  wherein the step of encoding the coding macroblock based on the difference includes the substep of
    assigning a difference bit designating that the coding macroblock is encoded with the difference.

52. The method according to claim 51, wherein the step of encoding the coding macroblock based on the difference further includes the substep of assigning a reference bit designating the location of the reference macroblock.

53. The method according to claim 51, wherein the encoding step is avoided, if an insubstantial difference exists between the coding macroblock and the reference macroblock.

54. The method according to claim 51, wherein the step of determining a difference between the coding macroblock and the reference macroblock further includes the substep of using the macroblock to the immediate left of the selected macroblock as the reference macroblock.

55. The method according to claim 51, wherein the step of determining a difference between the coding macroblock and the reference macroblock further includes the substep of using the macroblock above the selected macroblock as the reference macroblock.

56. The method according to claim 51, wherein the step of determining a difference between the coding macroblock and the reference macroblock further includes the substep of using the macroblock to the immediate left of the coding macroblock as a first reference macroblock and using the macroblock above the coding macroblock as a second reference macroblock.

57. A system for encoding for intra-frame coding with an intra-frame, comprising:

a storing component configured to store a reference macroblock from a single frame;

a receiving component configured to receive a coding macroblock to be coded from the same frame in an adjacent positional relationship to the reference macroblock;

a determining component configured to determine a difference between the coding macroblock and the reference macroblock; and an encoding component configured to encode the coding macroblock based on the difference without reference to any predicted frame to reduce spatial redundancy in the intra-frame coding, wherein the encoding component includes a first assigning component configured to assign a difference bit designating that the coding macroblock is encoded with the difference.

58. The system of claim 57, wherein the encoding component includes a second assigning component configured to assign a reference bit designating the location of the reference macroblock.

59. The system of claim 57, wherein the encoding component is avoided, if an insubstantial difference exists between the coding macroblock and the reference macroblock.

60. The system of claim 57, wherein the determining component includes a first using component configured to use the macroblock to the immediate left of the selected macroblock as the reference macroblock.

61. The system of claim 57, wherein the determining component includes a second using component configured to use the macroblock above the selected macroblock as the reference macroblock.

62. The system of claim 57, wherein the determining component includes a first using component configured to use the macroblock to the immediate left of the coding macroblock as a first reference macroblock and a second using component configured to use the macroblock above the coding macroblock as a second reference macroblock.

63. A method of decoding for intra-frame encoding with an intra-frame, comprising the steps, performed by a processor, of:

storing a reference macroblock from a single frame;

receiving a coded macroblock from the same frame in an adjacent positional relationship to the reference macroblock, which was coded based on a difference with the reference macroblock and without reference to any predicted frame to reduce spatial redundancy in the intra-frame coding; and decoding the coded macroblock based on the difference, wherein the step of receiving a coded macroblock includes the substep of receiving a difference bit designating that the coded macroblock is encoded with the difference based on the reference macroblock.

64. The method according to claim 63, wherein the step of receiving a coded macroblock further includes the substep of receiving a reference bit designating the location of the reference macroblock against which the difference is determined for decoding the coded macroblock.

65. A system of decoding for intra-frame coding with an intra-frame, comprising:

a storing component configured to store a reference macroblock from a single frame;

a receiving component configured to receive a coded macroblock from the same frame in an adjacent positional relationship to the reference macroblock, which was coded based on a difference with the reference macroblock and without reference to any predicted frame to reduce spatial redundancy in the intra-frame coding; and a decoding component configured to decode the coded macroblock based on the difference, wherein the receiving component includes a difference bit receiving component configured to receive a difference bit designating that the coded macroblock is encoded with the difference based on the reference macroblock.

66. The system of claim 65, wherein the receiving component includes a receiving component configured to receive a reference bit designating the location of the reference macroblock against which the difference is determined for decoding the coded macroblock.

* * * * *